United States Patent [19]

Beshai et al.

[11] Patent Number: 6,034,960
[45] Date of Patent: Mar. 7, 2000

[54] ATM SERVICE SCHEDULER USING REVERSE-BINARY SCATTERING AND TIME-SPACE MAPPING

[75] Inventors: Maged E. Beshai, Stittsville; Stacy W. Nichols; Todd D. Morris, both of Kanata, all of Canada

[73] Assignee: Nortel Networks Corporation, Montreal, Canada

[21] Appl. No.: 08/985,297

[22] Filed: Dec. 4, 1997

[51] Int. Cl.[7] ............................ H04L 12/28; H04L 12/56; H04J 3/16
[52] U.S. Cl. ............................ 370/395; 370/412; 370/468
[58] Field of Search .................................. 370/414, 458, 370/395, 412, 468, 230, 397, 399

[56] References Cited

U.S. PATENT DOCUMENTS

| | | | |
|---|---|---|---|
| 5,297,140 | 3/1994 | Boyer et al. ............................ | 370/61 |
| 5,390,184 | 2/1995 | Morris ..................................... | 370/94.2 |
| 5,561,663 | 10/1996 | Klausmeier .............................. | 370/412 |
| 5,579,312 | 11/1996 | Regache ................................... | 370/60.1 |
| 5,602,830 | 2/1997 | Fichou et al. ............................ | 370/232 |
| 5,629,937 | 5/1997 | Hayter et al. ............................ | 370/399 |
| 5,712,851 | 1/1998 | Nguyen et al. .......................... | 370/399 |
| 5,748,614 | 5/1998 | Wallmeier ................................ | 370/412 |
| 5,889,779 | 3/1999 | Lincoln .................................... | 370/412 |
| 5,905,729 | 5/1999 | Gaddis et al. ........................... | 370/412 |
| 5,920,568 | 7/1999 | Kurita et al. ............................. | 370/412 |

*Primary Examiner*—Chau Nguyen
*Assistant Examiner*—Phuongchau Ba Nguyen

[57] ABSTRACT

A method for scheduling low delay-jitter cell transmissions for multiple streams of Asynchronous Transfer Mode (ATM) traffic from a node is disclosed. Cells belonging to multiple streams of virtual circuits (VCs) and virtual paths (VPs) are stored in the node's memory. A link controller scans a time-space map to determine when a given stream will be sampled and its cells transmitted from the memory out over a link. The time-space map is comprised of time-slots whose spatial positions within the map correspond to times at which cells can be transmitted. A scattering technique, based on reverse-binary or other mapping schemes, ensures that each given stream occupies time-slots that are well-spaced within the time-space map. This ensures that cells belonging to a given stream are transmitted at well-spaced intervals of time. The scheduler can provide each stream with a guaranteed real number of time-slots per time-space map, which allows for high resolution service rates to be supported without having to resort to using very large maps.

25 Claims, 17 Drawing Sheets

| | Cycle M | Cycle M+1 |
|---|---|---|
| Guaranteed time-slot allocation | 50.6 | 50.6 |
| Carry-over from previous cycle | 0.2 | 0.8 |
| Total number of slots owed to stream | 50.8 | 51.4 |
| Number of slots granted to stream this cycle | 50 | 51 |
| Carry-over from this cycle | 0.8 | 0.4 |

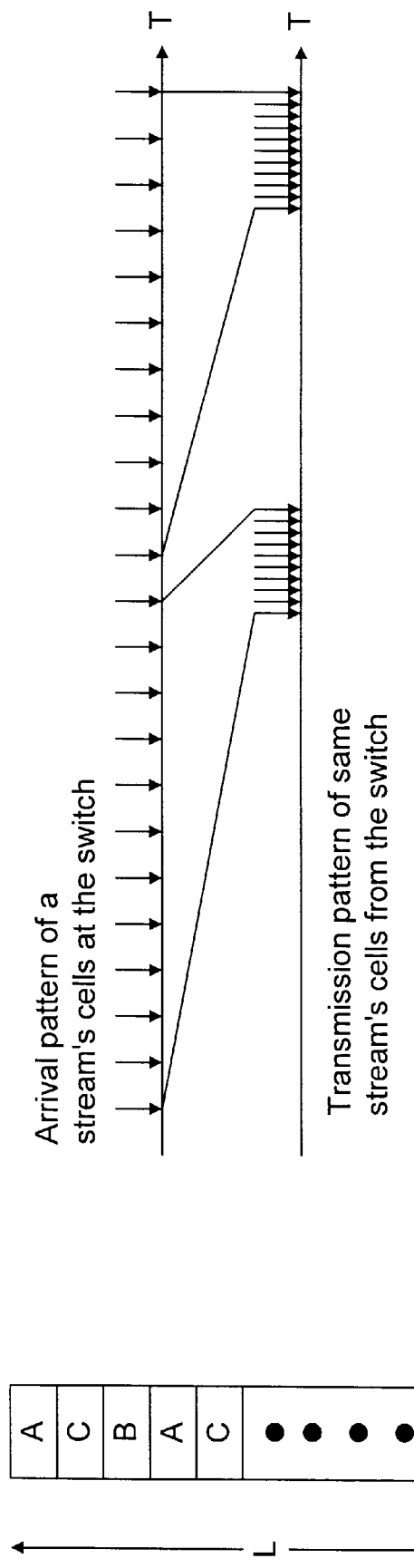
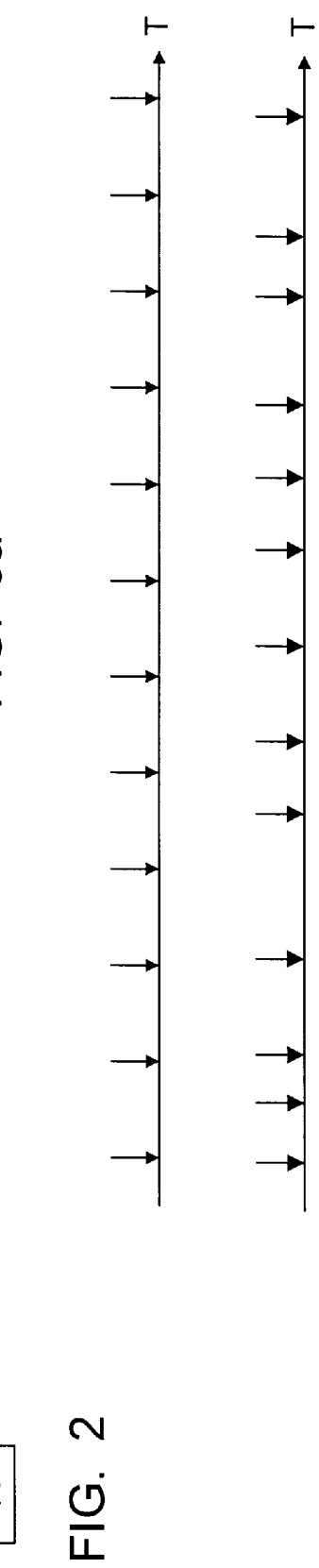
FIG. 3a
FIG. 3b
FIG. 2

FIG. 4

Transforms from forward binary to reverse binary numbers (4 bits per number)

| Normal | Binary | | | | Reverse |
|---|---|---|---|---|---|
| 0  | 0 | 0 | 0 | 0 | 0  |
| 1  | 0 | 0 | 0 | 1 | 8  |
| 2  | 0 | 0 | 1 | 0 | 4  |
| 3  | 0 | 0 | 1 | 1 | 12 |
| 4  | 0 | 1 | 0 | 0 | 2  |
| 5  | 0 | 1 | 0 | 1 | 10 |
| 6  | 0 | 1 | 1 | 0 | 6  |
| 7  | 0 | 1 | 1 | 1 | 14 |
| 8  | 1 | 0 | 0 | 0 | 1  |
| 9  | 1 | 0 | 0 | 1 | 9  |
| 10 | 1 | 0 | 1 | 0 | 5  |
| 11 | 1 | 0 | 1 | 1 | 13 |
| 12 | 1 | 1 | 0 | 0 | 3  |
| 13 | 1 | 1 | 0 | 1 | 11 |
| 14 | 1 | 1 | 1 | 0 | 7  |
| 15 | 1 | 1 | 1 | 1 | 15 |

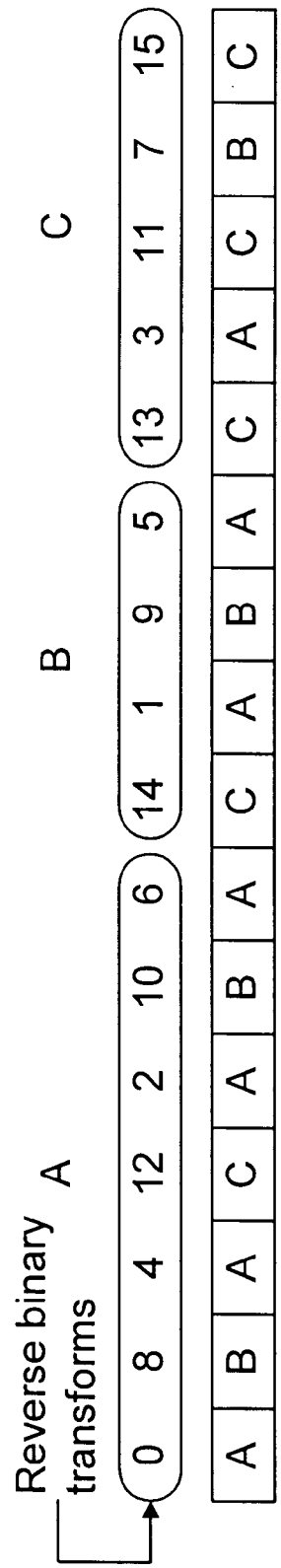

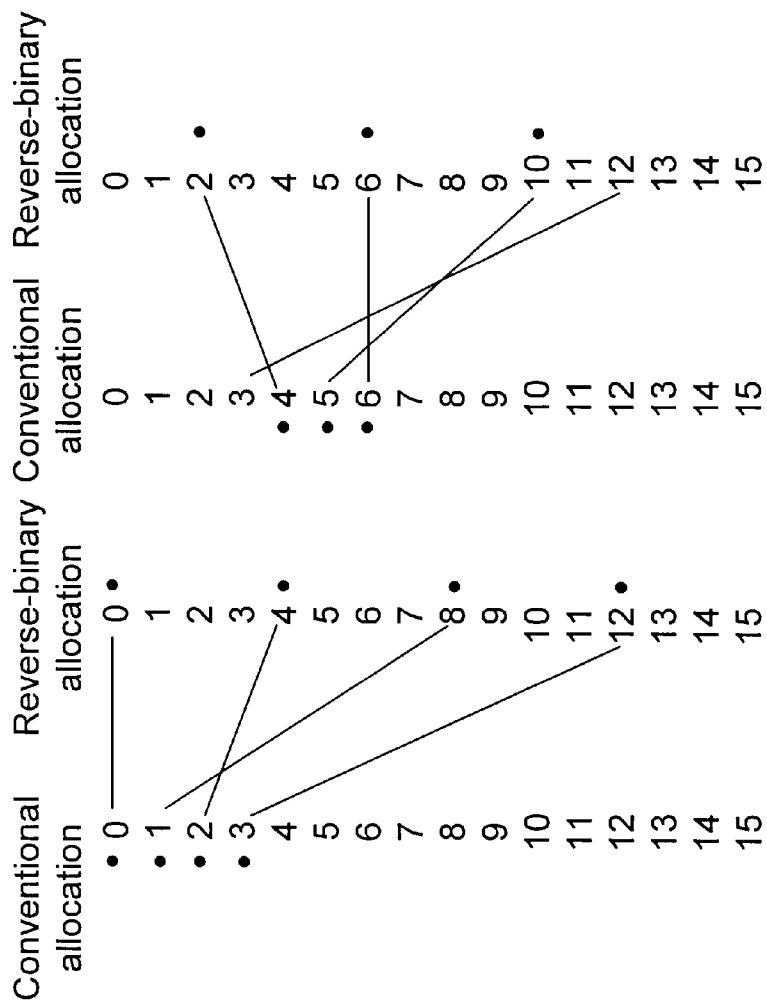

FIG. 10

Time-slot allocation per stream per frame-cycle

| Stream number | 0 | 1 | 2 | 3 | 4 | 5 | 6 | 7 | [1...7] |
|---|---|---|---|---|---|---|---|---|---|
| Guaranteed time-slot allocation | 50.60 | 42.71 | 131.80 | 235.33 | 81.46 | 39.95 | 168.26 | 273.79 | 1024 |
| Frame cycle 1 | 50 | 42 | 131 | 235 | 81 | 39 | 168 | 273 | 1019 |
| 2 | 51 | 43 | 132 | 235 | 81 | 40 | 168 | 274 | 1024 |
| 3 | 50 | 43 | 132 | 235 | 82 | 40 | 168 | 274 | 1024 |
| 4 | 51 | 42 | 132 | 236 | 81 | 40 | 169 | 273 | 1024 |
| 5 | 51 | 43 | 132 | 235 | 82 | 40 | 167 | 274 | 1024 |
| 6 | 50 | 43 | 131 | 235 | 81 | 40 | 169 | 274 | 1023 |
| 7 | 51 | 42 | 132 | 236 | 82 | 39 | 168 | 274 | 1024 |
| 8 | 50 | 43 | 132 | 235 | 80 | 41 | 169 | 274 | 1024 |
| 9 | 51 | 43 | 132 | 233 | 83 | 40 | 168 | 274 | 1024 |
| 10 | 51 | 42 | 130 | 238 | 81 | 40 | 168 | 274 | 1024 |
| 11 | 50 | 42 | 133 | 235 | 82 | 40 | 168 | 274 | 1024 |
| 12 | 51 | 44 | 132 | 235 | 81 | 40 | 169 | 273 | 1024 |
| 13 | 49 | 42 | 132 | 236 | 81 | 40 | 168 | 274 | 1024 |
| 14 | 52 | 43 | 132 | 235 | 82 | 40 | 168 | 274 | 1024 |
| 15 | 51 | 43 | 132 | 235 | 81 | 40 | 168 | 274 | 1024 |
| 16 | 50 | 42 | 131 | 236 | 82 | 40 | 169 | 273 | 1023 |
| 17 | 51 | 43 | 132 | 235 | 81 | 39 | 168 | 274 | 1024 |
| 18 | 50 | 42 | 132 | 235 | 82 | 41 | 168 | 274 | 1024 |
| 19 | 51 | 43 | 132 | 236 | 80 | 40 | 168 | 274 | 1024 |
| 20 | 51 | 43 | 132 | 233 | 83 | 40 | 169 | 273 | 1024 |

FIG. 11

| Stream number | 0 | 1 | 2 | 3 | 4 | 5 | 6 | 7 |
|---|---|---|---|---|---|---|---|---|
| Guaranteed time-slot allocation | 50.60 | 42.71 | 131.80 | 235.33 | 81.46 | 39.95 | 168.26 | 273.79 |
| Frame Cycle | | | | | | | | |
| 1 | 0.60 | 0.71 | 0.80 | 0.33 | 0.46 | 0.95 | 0.26 | 0.79 |
| 2 | 0.20 | 0.42 | 0.60 | 0.66 | 0.92 | 0.90 | 0.52 | 0.58 |
| 3 | 0.80 | 0.13 | 0.40 | 0.99 | 0.38 | 0.85 | 0.78 | 0.37 |
| 4 | 0.40 | 0.84 | 0.20 | 0.32 | 0.84 | 0.80 | 0.04 | 1.16 |
| 5 | 0.00 | 0.55 | 0.00 | 0.65 | 0.30 | 0.75 | 1.30 | 0.95 |
| 6 | 0.60 | 0.26 | 0.80 | 0.98 | 0.76 | 0.70 | 0.56 | 0.74 |
| 7 | 0.20 | 0.97 | 0.60 | 0.31 | 0.22 | 1.65 | 0.82 | 0.53 |
| 8 | 0.80 | 0.68 | 0.40 | 0.64 | 1.68 | 0.60 | 0.08 | 0.32 |
| 9 | 0.40 | 0.39 | 0.20 | 2.97 | 0.14 | 0.55 | 0.34 | 0.11 |
| 10 | 0.00 | 0.10 | 2.00 | 0.30 | 0.60 | 0.50 | 0.60 | 0.90 |
| 11 | 0.60 | 0.81 | 0.80 | 0.63 | 0.06 | 0.45 | 0.86 | 0.69 |
| 12 | 0.20 | 1.52 | 0.60 | 0.96 | 0.52 | 0.40 | 0.12 | 0.48 |
| 13 | 1.80 | 0.23 | 0.40 | 0.29 | 0.98 | 0.35 | 0.38 | 0.27 |
| 14 | 0.40 | 0.94 | 0.20 | 0.62 | 0.44 | 0.30 | 0.64 | 1.06 |
| 15 | 0.00 | 0.65 | 0.00 | 0.95 | 0.90 | 0.25 | 0.90 | 0.85 |
| 16 | 0.60 | 0.36 | 0.80 | 0.28 | 0.36 | 0.20 | 1.16 | 0.64 |
| 17 | 0.20 | 0.07 | 0.60 | 0.61 | 0.82 | 1.15 | 0.42 | 0.43 |
| 18 | 0.80 | 0.78 | 0.40 | 0.94 | 0.28 | 0.10 | 0.68 | 0.22 |
| 19 | 0.40 | 0.49 | 0.20 | 0.27 | 1.74 | 0.05 | 0.94 | 0.01 |
| 20 | 0.00 | 0.20 | 0.00 | 2.60 | 0.20 | 0.00 | 0.20 | 0.80 |

Carry over value per stream per frame-cycle

FIG. 12

|  | Cycle M | Cycle M+1 |
|---|---|---|
| Guaranteed time-slot allocation | 50.6 | 50.6 |
| Carry-over from previous cycle | 0.2 | 0.8 |
| Total number of slots owed to stream | 50.8 | 51.4 |
| Number of slots granted to stream this cycle | 50 | 51 |
| Carry-over from this cycle | 0.8 | 0.4 |

FIG. 15

| Frame cycle | Stream 0 | Stream 1 | Stream 2 | Stream 3 | Stream 4 | Stream 5 | Stream 6 | Stream 7 |
|---|---|---|---|---|---|---|---|---|
| | | | Fractions of link capacity allocated to rate-regulated streams | | | | | Fraction of link capacity allocated to unregulated stream |
| 0 | 0.09 | 0.08 | 0.12 | 0.10 | 0.16 | 0.22 | 0.09 | 0.14 |
| 1 | 0.09 | 0.10 | 0.12 | 0.10 | 0.16 | 0.22 | 0.09 | 0.12 |
| 2 | 0.09 | 0.10 | 0.12 | 0.10 | 0.12 | 0.22 | 0.09 | 0.16 |
| 3 | 0.09 | 0.10 | 0.12 | 0.10 | 0.12 | 0.22 | 0.15 | 0.10 |
| 4 | 0.09 | 0.10 | 0.12 | 0.10 | 0.12 | 0.22 | 0.15 | 0.10 |
| 5 | 0.02 | 0.06 | 0.12 | 0.10 | 0.12 | 0.22 | 0.15 | 0.21 |

A two level compound scheduler

ATM SERVICE SCHEDULER USING REVERSE-BINARY SCATTERING AND TIME-SPACE MAPPING

FIELD OF THE INVENTION

This invention relates to telecommunication networks, particularly Asynchronous Transfer Mode (ATM) networks. More particularly, this invention relates to a method and apparatus used for scheduling the transmission of cells over links in an ATM network.

BACKGROUND OF THE INVENTION

In traditional circuit switching (also called Synchronous Transfer Mode, or STM switching), scheduler frames of fixed length are used to schedule the transmission of voice traffic across network links. A scheduler frame is a time-space map residing in a switch's control apparatus. Each of its entries specifies a predefined connection that has data units queued for transmission over a given link. The position of each entry within the scheduler frame relates to a unique window of time during which one of those units will be transmitted out over the link, and is thus referred to as a time-slot. After a link controller reads in a connection identifier from one of the scheduler frame's time-slots, it will transmit a data unit belonging to that connection, at a time specified by the position of the time-slot within the frame.

In circuit switched voice networks, the data unit associated with each time-slot is typically one byte. Because a frame is scanned 8000 times per second, the rate at which each user is served is 8000 bytes/second, or an integer multiple thereof if the user is allotted more than one slot per frame. Time-slots are updated with new connection identifiers as new connections are created and torn down. In circuit switching, one can thus control the order in which various connections will be served (that is, the order in which the buffered data units of each connection are transmitted out over the link) by controlling the sequence of the contents of each link's scheduler frame. One can likewise control the rates at which each given connection will be served by controlling the number of time-slots that the connection is allocated within each frame.

At least three benefits accrue to users of these simple STM scheduler frames used in circuit switching. The first benefit is that there are never any collisions in the scheduler frame between two connections wishing to use the same time-slot. This is because a fixed-allocation scheme is used, meaning each connection always gets not only the same number of time-slots per frame, but the very same time-slots within a frame, for each frame-cycle. Collisions are undesirable because they require that the switch allocate computing power to resolve the collision situation, resulting in reduced throughput. The second benefit associated with STM scheduler frames is that the variance of each connection's sampling interval, which is the length of time that elapses between the start of successive samples of a connection's data units, is zero. This means that the switch is not transmitting bursts of consecutive or almost consecutive data units belonging to the same connection, but rather is transmitting each connection's units at consistently-spaced intervals of time. Such transmissions are said to have zero delay-jitter and are highly desirable when dealing with delay-sensitive data that must be switched in a timely manner. The third benefit associated with STM scheduler frames stems from the operational and implementational simplicity associated with these fixed-size frames.

In light of the aforementioned benefits, it is desirable to adapt the simple and robust STM scheduler frames to schedule the transmission of ATM streams, which consist of one or more virtual circuits (VCs) and/or virtual paths (VPs), that share similar quality of service (QOS) requirements. Such fixed-size and fixed-allocation scheduler frames have yet to be used to handle ATM streams, which are received at arbitrary time-varying bit rates. This is because the use of traditional STM scheduler frames in ATM networks tends to result in wasted link capacity, especially if streams that have been assigned time-slots do not always have data to transmit. Using the STM frames to schedule ATM transmissions may also make it impossible to accommodate streams requiring bit-rates that are not integer multiples of the frame rate. Both shortcomings are significant when switching ATM streams and, as a result, variable length and/or variable-allocation frames have been typically used in many current ATM networks.

Many attempts have been made to overcome these shortcomings, in order to allow switches to manage the time-variant rates in ATM switching using frames that resemble the fixed-size, fixed-allocation frames used by STM switches. More particularly, one of the broad approaches to this challenge involves calculating a carefully selected equivalent bit-rate (EBR) at which to serve an ATM stream and thereafter treating the stream as though it were an STM connection. Under this approach, each time-slot would be set to represent the period of time required to transmit one complete ATM cell, and each ATM stream would be allocated a fixed given number of time-slots, within a scheduler frame, based on the stream's calculated EBR. Then, the scheduling apparatus would work by giving each stream its allocated number of time-slots per frame-cycle, so that ATM traffic is scheduled much like STM traffic.

A simple variant of a scheduler implementation, for example, is the weighted round-robin method of scheduling the transmission of cells. Consider a link which is shared by K streams. A scheduler controlling this link's utilization would assign to each of the K streams a number of time-slots $x_0, x_1, \ldots x_{(K-1)}$, where $x_N$ is the maximum number of slots in a single frame that could be allocated to a stream, N ($x_N$ is based on the calculated EBR for stream N). The scheduler frame thus has a size of $x_0+x_1+ \ldots +x_{(K-1)}$ time-slots when all the streams have cells to transmit. At the start of each frame-cycle, the streams are polled in a round-robin fashion. If a stream, J, has no cells to transmit, it gets no slots. If J has cells to transmit, it is granted the number of slots it requires up to a predetermined maximum $x_J$. Entries denoting stream J are then placed into $x_J$ contiguous slots in the frame. The next stream, stream (J+1) modulo K, is then polled and the process is repeated. Under this scheme, time-variant service rates can be supported unlike the situation under an STM scheme, and no bandwidth is wasted as slots are allocated only to streams that need them. Under the round robin scheme however, as the number of streams supported by the scheduler increases, the variance of each stream's sampling interval increases. This leads to intolerable levels of delay-jitter. Consequently, the weighted round-robin scheduler does not provide a workable solution to the challenge of using simple and robust STM scheduler frames to control the transmission of ATM traffic.

Nonetheless, the weighted round-robin scheme can form the basis of more involved implementations. Many such implementations try to reduce delay-jitter by preventing the elapsed time between two consecutive departures of cells belonging to the same stream from exceeding the maximum allowable cell delay variation (CDV) for that stream (see U.S. Pat. No. 5,602,830 for example). This solution is achieved by calculating a theoretical preferred time of transmission for each incoming cell, converting that time into a preferred frame slot number in the frame, and then searching the frame for the nearest available slot to the preferred slot. The problem with such implementations is that they can cause scheduling collisions between streams. As mentioned previously, collisions require a scheduler to engage in many complex operations in order to determine which stream should prevail, and in order to allow streams that do not get their ideal slot to still meet their service requirements (see U.S. Pat. No. 5,602,830 for example). However, the more complex these operations, the longer they take to run, and the longer the frame access-time. So even these alternative implementations currently suffer from inherent limitations.

SUMMARY OF THE INVENTION

It thus is an object of the present invention to provide a simple and robust method and apparatus for scheduling transmissions of Asynchronous Transfer Mode (ATM) cells based on the scheduler frame concept used in STM switching, in order to capitalize on the aforementioned advantages of using STM-type scheduler frames. The method and apparatus should at the same time provide for the efficient use of bandwidth, and offer highly precise and arbitrary service rates to a large number of streams.

One aspect of this invention involves, in an ATM switch, a process of scheduling cell transmissions out over a link for different streams of virtual circuits (VCs) or virtual paths (VPs) by having a link controller that effects such transmissions periodically scan a time-space map, that is comprised of time-slots whose positions within the map correspond to times during which data can be transmitted over an outgoing link and which time-slots are periodically updated with stream-number entries that each corresponds to a stream, so that a stream-number entry written into the Nth time-slot of a given map corresponds to the stream that will own the Mth cell transmitted as a result of the link controller scanning the map, where M and N are related by a one-to-one mapping relation.

Delay-jitter can thus be reduced by using mapping relations, such as reverse-binary mapping relations, that rapidly and effectively scatter the time-slot allocations of each stream throughout a time-space map.

Another important aspect of this invention allows the scheduler to simultaneously support highly precise service rates and provide excellent responsiveness to changing capacity requirements, by being able to offer each stream a real number of time-slots, on average, per frame. This aspect is implemented in an ATM switch wherein cell transmissions out over a link are scheduled for different streams of virtual circuits (VCs) or virtual paths (VPs), and wherein each stream is allocated an integer number of time-slots during each frame-cycle, a frame-cycle being a single iteration of the periodically repeated process of allowing all the streams a chance to update a time-space map with stream-number entries that each correspond to a stream, by a time-slot allocation process executed for each frame-cycle that comprises the steps of: causing each stream to have allocated to it the integer part of the real-number representation of the sum of a guaranteed time-slot allocation for the stream and a carry-over for the stream, the carry-over for the stream being the difference between the total number of time-slots owed to the stream and the total number of time-slots allocated to the stream just prior to the present frame-cycle; and, setting the carry-over for the next frame-cycle equal to the non-integer part of the sum of the guaranteed time-slot allocation for the stream and the carry-over for the stream.

BRIEF DESCRIPTION OF THE DRAWINGS

Embodiments of the invention will now be discussed with reference to the accompanying drawings, in which:

FIG. 2 illustrates a scheduler frame;

FIG. 3*a* illustrates a bursty, high delay-jitter transmission;

FIG. 3*b* illustrates a well-scattered, low delay-jitter transmission;

FIG. 4 illustrates how reverse-binary numbers are generated;

FIG. 5 is an illustration of a scheduler frame when the weighted round-robin method is used to update time-slots;

FIG. 6 is an illustration of a scheduler frame when reverse-binary scattering is used to update time-slots;

FIG. 7 illustrates how reverse-binary scattering breaks-up clusters of time-slots;

FIG. 10 shows a numerical example that sets out the number of slots allocated in each frame-cycle to each stream, by the embodiment of FIG. 9;

FIG. 11 shows a numerical example that sets out the carry-over values stored by each stream between frame-cycles, by the embodiment of FIG. 9;

FIG. 12 shows a table that illustrates, using a numerical example, how carry-over values and time-slot allocations are calculated by the embodiment of FIG. 9.

FIG. 15 illustrates how the service rate allocated to a stream whose rate is unregulated, is affected by the varying rate allocations made to rate-regulated streams;

DETAILED DESCRIPTION OF THE PREFERRED EMBODIMENTS

Figure 1:
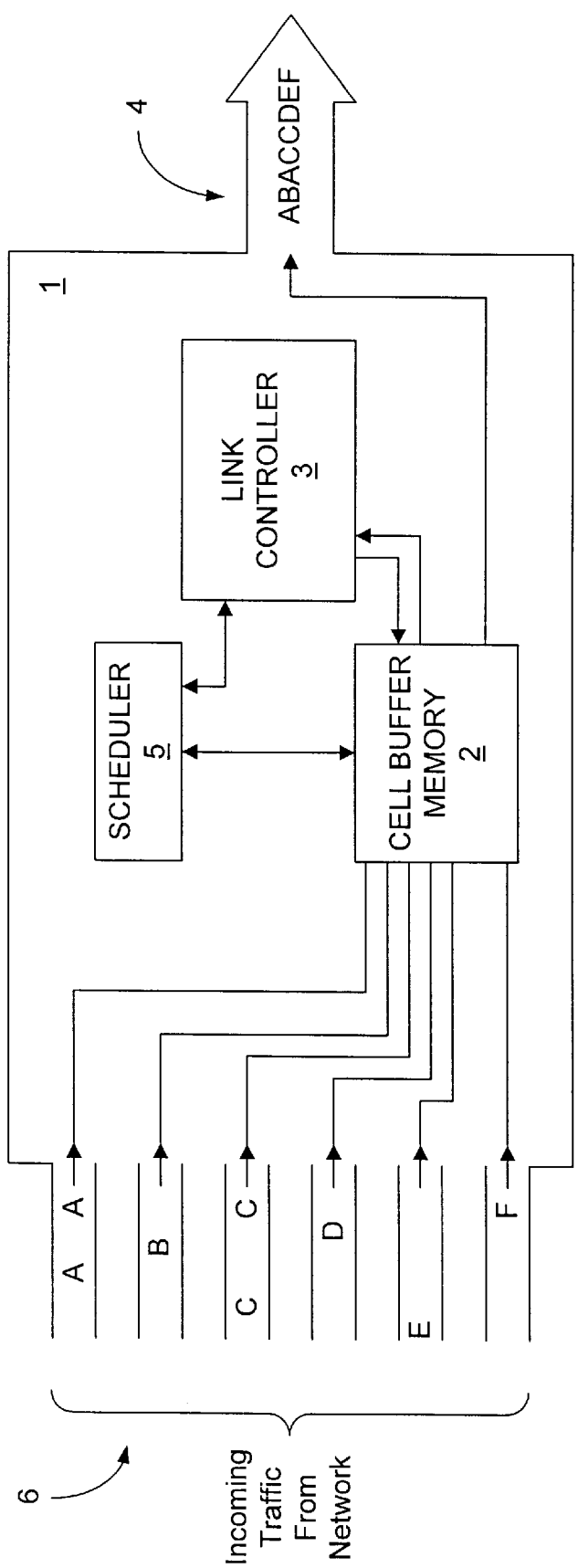
FIG. 1 illustrates the function that the scheduler carries out when viewed from a switch-wide perspective.

FIG. 1 illustrates the role of a scheduler, at a macroscopic level. A switch 1 contains a cell buffer memory 2, a link controller 3 that effects transfers of cells from the cell buffer memory 2 out over a link 4, and a scheduler 5. Though only one output link 4 is illustrated in the switch 1 of FIG. 1, a switch can have many output links. There is a scheduler and a link controller for every output link on the switch 1.

The role of the scheduler 5 can be defined as instructing the link controller 3 at what times to effect the transmission of each of the cells stored in the cell buffer memory 2. The scheduler 5 is said to be serving a given stream of virtual circuits (VCs) or virtual paths (VPs) when it instructs the link controller 3 to transmit cells belonging to that stream out over the link 4.

The role of the scheduler 5 can also be defined as that of allocating link capacity amongst several requesting streams. With reference to FIG. 1, cells from many different sources 6 are transmitted over the link 4. These cells must be multiplexed onto the common single outgoing link 4. The scheduler 5 determines how to divide the capacity of the link 4 given the competing demands of, and the service rates guaranteed to, the various streams of VCs and VPs being served.

FIG. 2 describes the key data structure of the disclosed scheduler 5, a time-space map with L entries referred to as a scheduler frame. Each entry contains a stream-number, for example, A, B and C, that each serves as a means of identifying an individual stream. The position of each entry within the frame corresponds to a specific period of time during which a single cell can be sampled and transmitted, and which is referred to as a time-slot. It is to be understood that a time-slot can also correspond to a period of time during which data units other than a cell can be sampled and transmitted. The stream-number stored in a given entry corresponds to the stream that owns the cell to be sampled and transmitted during a corresponding time-slot.

With reference to FIGS. 1 and 2, yet another way to define the role of the scheduler 5 is as the means by which the link controller 3 obtains a sequence with which cells are transmitted. The link controller 3 obtains a sequence with which to transmit cells by reading the scheduler frame of FIG. 2, which is populated with stream-numbers by a scheduler 5. For example, assume that the link controller 3 begins reading the frame of FIG. 2, starting at the first time-slot. Since the stream-number 'A' will be read first, stream A will be served first, which means that a cell belonging to stream A will be served at some time $t_0$. The link controller 3 would next read stream C in the second time-slot, and therefore serve stream C at time $t_0+\tau$, where $\tau$ is the amount of time required to serve a single stream. The frame depicted in FIG. 2 also shows that stream B will be served at time $t_0+2\tau$, and at least one more time in this frame-cycle, at $t_0+(L-1)T$. It will be appreciated that it is also possible to read out the entries inside the time-slots in a different order. Therefore, seen at this general level of detail, the role of the scheduler 5 can be defined as the process of filling a scheduler 5 frame such as the one illustrated in FIG. 2 with stream-number entries, and then later causing those entries to be scanned in a particular order, so as to allow the scheduler to control the order in which the link controller 3 sends cells out over the link 4.

The frame in FIG. 2 is somewhat similar to an STM frame in that both are fixed in length and read by link controllers to schedule the transmission of data out over a link. Both also allocate time-slots to each stream/connection based on its service rate. For example, if a stream, Y, requires a rate of 16 Mb/s, if the frame is sized at 1,000 time-slots, and if the outgoing link is an OC-12 link with C~620 Mb/s, then Y should receive the following number, $x_Y$, of time-slots per frame:

$$x_Y = (16/620) \times 1000 \text{ slots/frame}$$
$$= 25.806 \text{ slots/frame}$$

Such a number is the guaranteed number of time-slots that will be allocated to a stream over a given period of time, and is hereinafter referred to as a guaranteed time-slot allocation. It should be noted that this calculation can be done independently of the size of the data units being sent out over the link.

As similar as the frames used in this invention are to STM scheduler frames, the following key traits differentiate the two:

1) The number of slots allocated by this scheduler to each stream varies from frame cycle to frame cycle. That is, a stream may not receive the number of time-slots per frame required for it to be served at its equivalent bit rate (EBR) during every frame-cycle, unlike an STM connection that always receives the same number of slots for every frame cycle.

2) The entire scheduler frame must be reconstructed every frame-cycle, not only to reflect the arrival and departure of streams, but also to vary the number of slots allocated to each stream. STM frames are normally not reconstructed; their time-slot entries are modified in order to reflect the arrival and departure of connections.

3) The size of the scheduler frame can be easily adjusted to support service rates at varying degrees of precision. In STM, the frame sizes are not so readily adjusted. This limits the precision of the service rates STM frames can support. To understand how the number of time-slots per frame is related to the precision of service rates that can be supported, consider a frame of 100,000 time-slots. A stream which is allocated 2.143% of the frame's capacity is guaranteed 2143 slots per frame, which results in no rate-error. If the frame size shrinks to 10,000 time-slots however, the same stream is allocated 215 time-slots per frame (assuming that rounding-up is taking place), which results in a rate-error of 0.33% (i.e. the stream is receiving 0.33% more capacity than it needs). If the frame size shrinks further to 100 time-slots, then the stream is allocated 3 time-slots per frame, which results in a rate-error of 40%. Therefore, as the number of time-slots per frame is decreased, the precision of the rates supported by the scheduler also decreases, and more bandwidth may be lost.

4) Notwithstanding the need to keep frame sizes large in order to provide more precise service rates, the number of time-slots contained in each scheduler frame must be limited in order to limit the length of the frame update period, which is the time needed to write the stream-numbers into the L time-slots, and the frame-scanning period, which is the time the link controller takes to scan all the stream numbers in the L time-slots so it can serve all the streams in the order and proportions indicated therein. The frame update period must be kept small to maintain the system's responsiveness to changes in the service requirements of the supported streams, while the frame update period should be kept slightly smaller than the frame scanning period, to ensure that only freshly updated stream-number entries are scanned by the link controller each frame-cycle.

Using the aforementioned scheduler frame, the scheduler described herein is able to support many features. One of these is an ability to avoid high delay-jitter. As illustrated in FIG. 3a, high delay-jitter transmissions are caused by a switch taking as input a steady flow of cells from a stream, and generating as output bursts of consecutive or almost consecutive cells belonging to the stream, and then waiting a relatively long period of time before transmitting another burst of cells belonging to that same stream. FIG. 3a illustrates the effect of such a switch on a stream. The data stream at the top of FIG. 3a depicts the frequency with which cells belonging to a stream are being received by a switch. This input can be characterized as a low delay-jitter transmission, because the sampling intervals (the length of time that elapses between the start of successive samples of a stream's data units) of the stream exhibit a low variance. By contrast, the output illustrated in the bottom half of FIG. 3a, has a much higher sampling interval variance. The switch packs, what was at the switch's input a well-distributed stream of cells, into irregularly occurring bursts of cells at the output. This amounts to the introduction of delay jitter into the stream. Low delay-jitter switching, which would be achieved if the output of FIG. 3b is achieved, is an absolute requirement of schedulers that support the transfer of delay-sensitive data.

The proposed scheduler achieves low-delay jitter transmissions by updating time-slots with stream-number entries, or by scanning time-slots for stream-number entries, using mapping relations such as reverse-binary mapping for example. Reverse-binary mapping is illustrated in FIG. 4. To the left of FIG. 4 is a column of the integer numbers [0 . . . 15], listed in ascending order. To the right of the 'Normal' column is a column of binary numbers, each of which is a binary representation of the decimal number to its immediate left. In turn, to the right of the binary numbers, lies another column of the decimal integer numbers [0 . . . 15], that are sequenced in "reverse-binary" order. Each number under the 'Reverse' column can be derived by reading-in the bit with the leftmost bit being the least significant bit and the rightmost bit being the most significant bit (as opposed to the conventional representation of binary numbers where the leftmost bit is the most significant bit and the rightmost bit is the least significant bit).

If all the time-slots allocated to each stream are updated with stream-number entries using reverse-binary mapping, each stream will receive a well-scattered assortment of time-slots throughout the frame, and low delay-jitter transmissions would result if the time-slots are later scanned in sequential order by the link controller. FIG. 5, which depicts the time-slot allocations of a 16-slot scheduler frame, illustrates this observation. Assume three streams are scanned in the order A, B, C, and that A requires 7 time-slots, B requires 4 time-slots and C requires 5 time-slots, of a 16 time-slot frame. Assuming the streams will be serviced in the order {A, B, C}, in the weighted round-robin implementation, stream A would get time-slots 0 to 6, stream B would get time-slots 7 to 10 and stream C would get time-slots 11 to 15, as shown in FIG. 5. This would ultimately cause a bursty high delay-jitter transmission. Attempts to optimally allocate the cells of stream A, then the cells of stream B and finally the cells of stream C can result in the occurrence of collisions. Under this scheduler by contrast, as shown in FIG. 6, stream A would receive the time-slots corresponding to the reverse-binary representations of 0 to 6, or namely time-slots 0, 8, 4, 12, 2, 10 and 6. Stream B and stream C would receive similarly scattered time-slots as shown in FIG. 6. As a result, a well-scattered distribution of time-slot allocations is achieved using a simple method with no collisions occurring, due to the one-to-one correspondence between integer numbers and their reverse-binary representations. A low-delay jitter transmission will result when the time-slots of such a frame are sequentially scanned.

An equivalent alternative, which may be marginally simpler to implement, is to store the stream-numbers in consecutive time-slots of the frame, as would be done in the Weighted Round-Robin Scheduler, but then later scan the time-slots in reverse-binary order of the clock cyclic time, the clock cycle length being equal to the frame length. Though each stream would occupy consecutive time-slots in the frame as in FIG. 5, the link controller will scan the time-slots in reverse-binary order in order to achieve the same well-scattered distribution it would achieve if it sequentially scanned the time-slots from the frame illustrated in FIG. 6.

Applying reverse-binary ordering to either the sequence in which time-slots are updated, or the sequence with which time-slots are scanned by the link controller, is an effective way of scattering the time-slot allocations of each stream throughout a frame, as shown in FIG. 7. FIG. 7 illustrates how a stream that would receive the clustered time-slots 0 to 3 under the weighted round robin scheme, would instead receive the well-scattered time-slots 0, 4, 8 and 12 under this invention's scheduling scheme. It also illustrates how a stream that would receive the clustered time-slots 3 to 6 under the weighted round robin scheme, would instead receive time-slots 2, 6, 10 and 12 under this invention's scheduling scheme. It should be noted that only a negligible amount of additional processing power is required to sequence update or scan operations using reverse-binary ordering.

Figure 8:
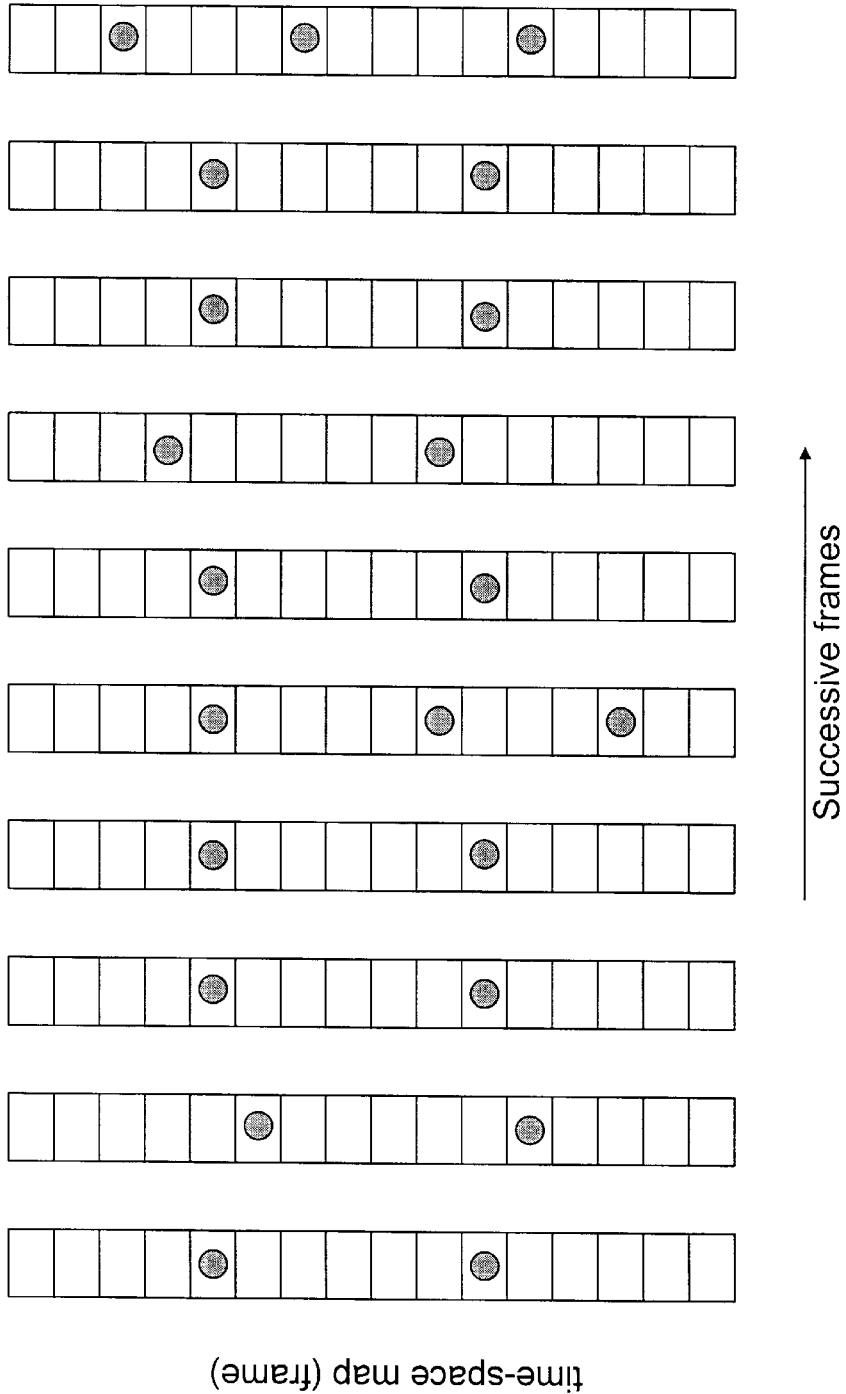
FIG. 8 is an illustration that shows how a stream can be given a real number of time-slots, on average, per frame.

Another novel feature of this invention gives streams highly precise service rates by allowing one to set the guaranteed number of time-slots per frame for each stream, to a real number. This would allow frames with a smaller number of time-slots to be used, which keeps frame update and scanning times low without sacrificing the system's ability to provide high resolution service rates. The method by which this feature is implemented, is illustrated in FIG. 8 which depicts the time-slots allocated to a single stream over ten consecutive frame-cycles. The scheduler can accommodate requests for a real-number of time-slots per frame, by varying the integer number of time-slot allocations made to each stream per frame-cycle, between integers that are close in value to the ideal real-number time-slot allocation, as shown in FIG. 8. In the example of FIG. 8, the ideal service rate of the given stream is 2.2 time-slots per frame. The invention allocates an average rate of 2.2 time-slots, by providing 3 time-slots every fifth frame-cycle, and 2 time-slots in all other cycles. By using such an averaging approach, highly precise service rates can be supported by relatively small frames that can be updated in short periods of time. It is to be understood that this method can be implemented to achieve much finer degrees of service precision than the degree of precision attained in this example.

Figure 9:
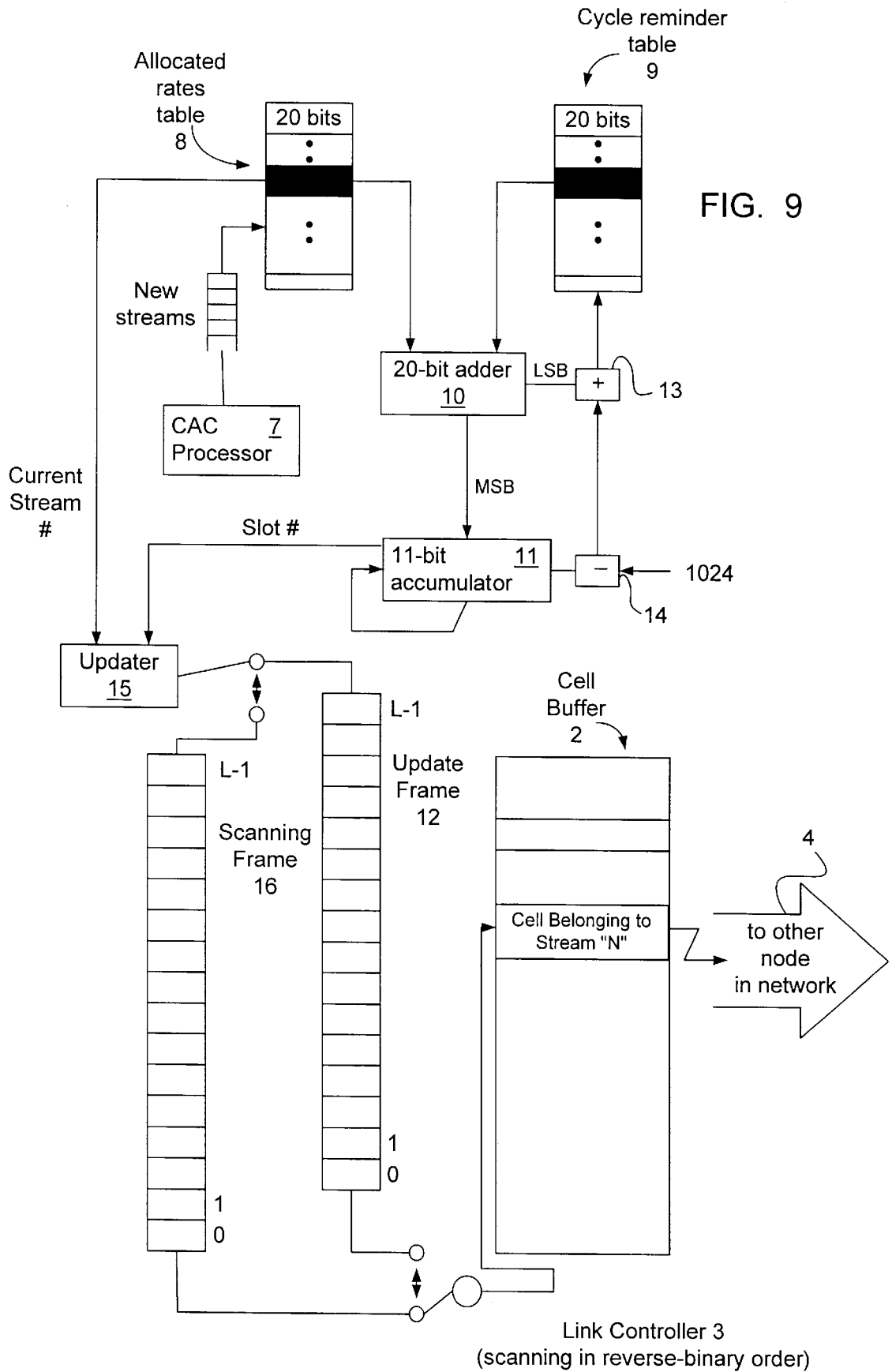
FIG. 9 illustrates schematically a block diagram of the components required to implement an embodiment of this invention.

All of the foregoing novel features can be implemented by a preferred embodiment of the invention, depicted in FIG. 1, and again in greater detail in FIG. 9, wherein time-slots are updated in sequential order and scanned in reverse-binary order. FIG. 9 illustrates the circuitry on an ATM switch that is used to schedule the transmission of cells, and includes all of the components illustrated in and disclosed with reference to FIG. 1.

FIG. 9 shows that the scheduler 5 consists of the following components, which are all tied to a common clock. A connection admission control (CAC) processor 7 is responsible for adding streams to or removing streams from service. It determines the EBR for new streams, converts each EBR to a guaranteed time-slot allocation value, and stores said values in an allocated rates table 8. The frame length in this example is 1024. A 20-bit adder 10 sums numbers fed in from the allocated rates table 8 and a cycle remainder table 9. The output of the 20-bit adder 10 holds the number of time-slots owed to each stream for a given frame-cycle. The number is represented by 20-bits, where the ten most significant bits (MSBs) represent the number of time-slots to be granted to the stream during the current frame-cycle, and where the ten least significant bits represent the remainder of a value less than unity that is to be credited to the same stream during the subsequent frame-cycle. The MSB part of the output is fed into an 11-bit accumulator 11 which stores the number of time-slots of an update frame 12 that have been allocated thus far in the frame-cycle. The LSB part of the output from the 20-bit adder 10 is fed back into the cycle remainder table 9.

The 11-bit accumulator 11 can also feed part of its output back into the cycle remainder table 9 through a circuit 14. The circuit 14 generates no input for the cycle remainder table 9 if the accumulated count in the 11-bit accumulator 11 is less than 1024 (since such a count indicates that all the time-slots of the update frame have not yet been allocated). Otherwise, the circuit 14 subtracts 1024 from the accumulated count, and then feeds the left-over value left-shifted by 10 bits to an adder 13. The adder 13 sums the LSB of the output of the 20-bit adder 10 to said left-shifted output of the circuit 14 and stores the result in the entry of the cycle remainder table 9 that is reserved for the current stream. In such a case, the output of the adder 13, which indicates the number of time-slots that are to be credited to the currently served stream during the subsequent frame-cycle, could exceed unity.

A frame updater 15 receives from the 11-bit accumulator 11 each value of the gradually changing accumulated count. The frame updater 15 also receives from the allocated rates table 8 the stream-number of the stream currently being served, this stream-number being globally known throughout the circuit. The frame updater 15 writes the stream-number into the time-slots of the frame that correspond to each number it receives from the 11-bit accumulator 11. In a preferred embodiment, time-slots are filled in sequential order. Therefore, while the frame updater 15 writes stream-number entries into the time-slots of the update frame 12, the link controller 3 scans a fully populated scanning frame 16 to determine in what order to transmit cells currently queued in the cell buffer memory 2. The scanning order could be reverse binary order, for example.

The following description, besides referring to FIG. 9, also refers to the sample data outputs of the scheduler that are listed in FIGS. 10 and 11. FIGS. 10 and 11 are presently described. Both figures contain sample output data that would be generated by the scheduler described by FIG. 9. The header row of FIG. 10 specifies the guaranteed time-slot allocations required by each stream. For example, it indicates that stream 3 is guaranteed 235.33 time-slots per frame. Each column in FIG. 10 represents the number of time-slots actually allocated to each stream over several frame-cycles. Each row represents the number of time-slots actually allocated to all the streams during a single frame-cycle. For example, one of the entries in the table indicates that, in cycle 4, stream 0 received 51 time-slots, stream 1 received 42 time-slots, etc. Another entry indicates that during frame-cycle 18, stream 6 received 168 time-slots.

FIG. 11 has the same header rows as FIG. 10. One of FIG. 11's entries represents the number of time-slots that the scheduler owes a given stream at the end of a given frame-cycle, notwithstanding the time-slot allocation that was just made to that stream. For example, one of the rows indicates that after frame-cycle 18, stream 6 was owed 0.68 time-slots, which will be added to the guaranteed 168.26 time-slot allocation for use in the next frame-cycle. Each of these entries is referred to as a "carry-over", and is carried over from frame-cycle to frame-cycle. Carry-overs are held in the cycle remainder table 9.

This is illustrated in FIG. 12. Therein, a table illustrates how carry-over values are calculated for a stream over two consecutive frame-cycles. The guaranteed time-slot allocation for the stream is 50.6 time-slots. In the first cycle, M, the carry over from the previous cycle is 0.20. Therefore, the total number of slots owed to the stream during cycle M is 50.6+0.2=50.8. The stream would receive the integer part of this number of slots (i.e. 50 time-slots) while 0.8 slots would be carried-over to the next cycle. In the next cycle, M+1, the previous cycle's carry-over of 0.8 is added to 50.6, so that the stream is now owed 51.40 slots. In cycle M+1, the stream would thus receive a higher integer number of time-slots, 51 time-slots, to compensate for the lower allocations the stream has received in previous cycles. A carry-over is generated by subtracting the 51 slots that are allocated from the 51.4 slots that are owed to the stream during this frame cycle.

Seen from a high-level viewpoint, the circuit depicted in FIG. 9 works in the following manner. The link controller 3 scans scanning frames 16 populated with newly updated stream-number entries, to sequence the dequeueing of cells for transmission from the cell buffer memory 2. That is, the link controller 3 scans the information in the scanning frame 16 to cause certain cells to be dequeued from the cell buffer memory 2 to the link 4 for transmission. While the scanning frame 16 is being scanned, the time-slots of the other scheduler frame, the update frame 12, are being updated with new stream-number entries so that it can be read by the link controller 3 during the next frame-cycle. As mentioned previously, the frame scanning period is slightly larger than the frame update period. The scanning frame 16 and update frame 12 swap roles at the end of each frame-cycle. A frame-cycle ends after all the contents of the scanning frame 16 have been scanned by the link controller 3 and, concurrently, all the time-slots in the update frame 12 have been updated.

In the following description of this same process made from a lower level viewpoint, it is assumed that the update frame 12 and scanning frame 16 each have 1024 time-slots, and that 8 streams are being served, as indicated in the example illustrated in FIG. 10 and FIG. 11. It is to be understood that the substitution of other values for these parameters still falls within the scope of the appended claims.

The allocated rates table 8 must be initialized before the update or scanning process can commence. A stream cannot be supported by this scheduler until it is given an entry in this table 8. A stream can obtain such an entry only after it has registered itself with the CAC processor 7. Registration cannot be complete, until the CAC processor 7 has determined that there is enough free link capacity for the scheduler to support the new additional stream. When this happens, the CAC processor 7 creates an entry in the allocated rates table 8 for the stream, and maps its stream-number, to a number of time-slots per frame that the stream will need to meets its prescribed service rate (i.e., its EBR). The entries in the allocated rates table 8 are the guaranteed time-slot allocations. They need not be integer numbers. In this particular embodiment, the ten most significant bits of each entry represent the integer component of a real number, while the ten least significant bits represent the fractional component of that same number. There is only one entry for every stream being served by the scheduler 5. The sum of all the allocated rates in the allocated rates table 8 should be less than or equal to L, where L is the total number of time-slots in the update frame 12 or scanning frame 16. In a preferred embodiment, L is set to equal a power of two, and is also set to be greater than the number of streams being supported in order to guarantee each stream a time-slot during cycles where all streams have cells to transmit. In a preferred embodiment, L is also set at some number greater than the number of streams supported, and typically two-times the number of streams supported rounded-up to the nearest power-of-two integer.

Once all the streams have been given entries in the allocated rates table 8, the update process can begin. Assume that the third frame-cycle has just ended, and that the scanning frame 16 and update frame 12 have just switched roles. The sum in the 11-bit accumulator 11, which represents the number of time-slots that have been assigned to streams thus far during the current frame-cycle, is reset to zero. The scheduler then begins to cycle through the entries in the allocated rates table 8, generally starting at the stream following the one that was last served at the end of the previous frame-cycle. Assuming that the last stream serviced in the preceding frame-cycle is stream 7, the scheduler will therefore start to populate the current update frame 12 with entries from stream 0. The guaranteed number of time-slots owed to stream 0 per frame-cycle is stored in the allocated rates table 8 as a 20 bit representation of a decimal number. As FIG. 10 and 11 both indicate, stream 0 is owed a guaranteed allocation of 50.60 time-slots per frame. A 20-bit representation of 50.60 is therefore read from the allocated rates table 8, and added inside the 20-bit adder 10 to the carry-over for stream 0 that has built-up over previous frame-cycles. The carry-over is read in from stream 0's current entry in the cycle remainder table 9. FIG. 11 indicates that this number is 0.80. The output of the 20-bit adder 10 represents the total number of time-slots the scheduler currently owes stream 0. That output is 51.40 time-slots. The adder 13 associated with the 20-bit adder 10, directs the ten least significant bits, representing 0.40 time-slots, to be passed back to stream 0's entry in the cycle remainder table 9 for use during the next frame-cycle. The ten most significant bits of this number—the integer component of 51.40—is passed to the 11 bit-accumulator 11. The 11-bit accumulator 11, which would be set at zero since it is assumed that a new update frame 12 has just been started, would be given a value of 51. Logic circuitry 14 associated with the 11-bit accumulator 11 compares the value 51 against the total frame size, L, which in this case is 1024. Since 51 is less than 1024, the logic circuitry 14 knows that the current update frame 12 is not yet full. The 11-bit accumulator 11 thus decides to allocate 51 time-slots to stream 0. The 11-bit accumulator 11 actually allocates the time-slots by beginning a down-count from 51, down to and including one. On the first count, the frame updater 15 writes the stream-number of the stream currently being updated by the scheduler, stream-number 0, into time-slot 0. This number can be obtained from the allocated rates table 8, as indicated previously. On subsequent counts, the frame updater 15 continues to write stream-number 0 into the next available numbered time-slot until the down-counter in the 11-bit accumulator 11 hits zero. When this happens, the allocations to stream 0 have been completed, the first 51 time-slots of the update frame have been updated with the stream-number denoting stream 0, and the scheduler 5 next begins to allocate time-slots to stream 1. It loads stream 1's entry of 42.71, from the allocated rates table 8 into the 20-bit adder 10. It also loads the carry-over of 0.13 time-slots that has currently accumulated inside stream 1's entry in the cycle remainder table 9 (see FIG. 11) into the 20-bit adder 10. The output from the 20-bit adder 10 is thus 42.84, meaning the adder 13 associated with the 20-bit adder 10 will allocate 42 time-slots to stream 1 during this frame-cycle (the ten most significant bits of the adder's 10 output), while writing a value of 0.84 (the ten least significant bits of the adder's 10 output) to stream 1's entry in the cycle remainder table 9. The logic circuitry 14 associated with the 11-bit accumulator 11 decides that the total number of time-slots allocated thus far in the frame-cycle is still well under 1024 even after these 42 time-slots are added to the previously accumulated value of 51. The frame updater 15 is thus instructed to write the stream-number representing stream 1 to the next 42 time-slots.

At the same time as the update frame 12 is being built up using the foregoing process, the scanning frame 16 is being concurrently scanned by the link controller 3. The link controller 3 scans the stream-number entries in the time-slots of the scanning frame 16 to sequence cell transmissions out over the link. Under this preferred embodiment of the scheduler, stream-number entries are scanned by the link controller in reverse-binary order of cyclic clock time. Every time a stream-number is scanned in by the link controller 3, the stream is eligible to transfer a cell from the cell buffer memory 2 for transmission out over the link 4. By scanning in reverse-binary order, the transmission of a widely-scattered spacing of cells out over the link 4 is achieved notwithstanding any repeated appearances of a single stream-number in contiguous time-slots of the scanning frame.

The remaining outputs listed in FIGS. 10 and 11 for the fourth frame-cycle, and indeed all the other cycles listed therein, can be understood by reference to the preceding explanation of the operation of the scheduler 5 operation. Of note, is the time-slot allocation received by stream 7 in this same fourth frame-cycle. Adding stream 7's carry-over and guaranteed time-slot allocation, yields a 20-bit adder 10 output of 274.16. However, as indicated in FIG. 10, the 11-bit accumulator 11 does not allocate 274 time-slots to stream 7 in the fourth frame-cycle, even though the 10 most significant bits of the output of the adder 10 add up to 274. This is because the logic circuitry 14 associated with the 11-bit accumulator 11, determines that the count of the accumulator 11 exceeds the frame's time-slot limit of 1024 when an attempt is made to allocate a 274th time-slot to stream 7. Because the update frame 12 is full, the frame-cycle ends (prematurely as far as stream 7 is concerned), stream 7 receives only 273 time-slots, and the stream 7 entry in the cycle remainder table 9 contains the large value of 1.16, as shown in FIG. 11. Such carry-over values exceeding one, can only be generated at the end of frame-cycles. These values are quickly reduced back to a level less than one however, since the stream with the large carry-over will be the first stream served during the next frame-cycle, so as to ensure that it receives its fair share of time-slots. In this example, stream 7 is assured a 274 time-slot frame during the next frame-cycle, as 1.16+273.79 equals 274.95, and as stream 7 will be the first stream served during the next frame cycle.

It is to be noted that the scattering effect of reverse-binary scanning by the link controller makes the scheduler not only completely averse to causing high-delay jitter, but also especially effective at breaking up high-delay jitter transmissions forwarded to it from other switches.

Figure 13:
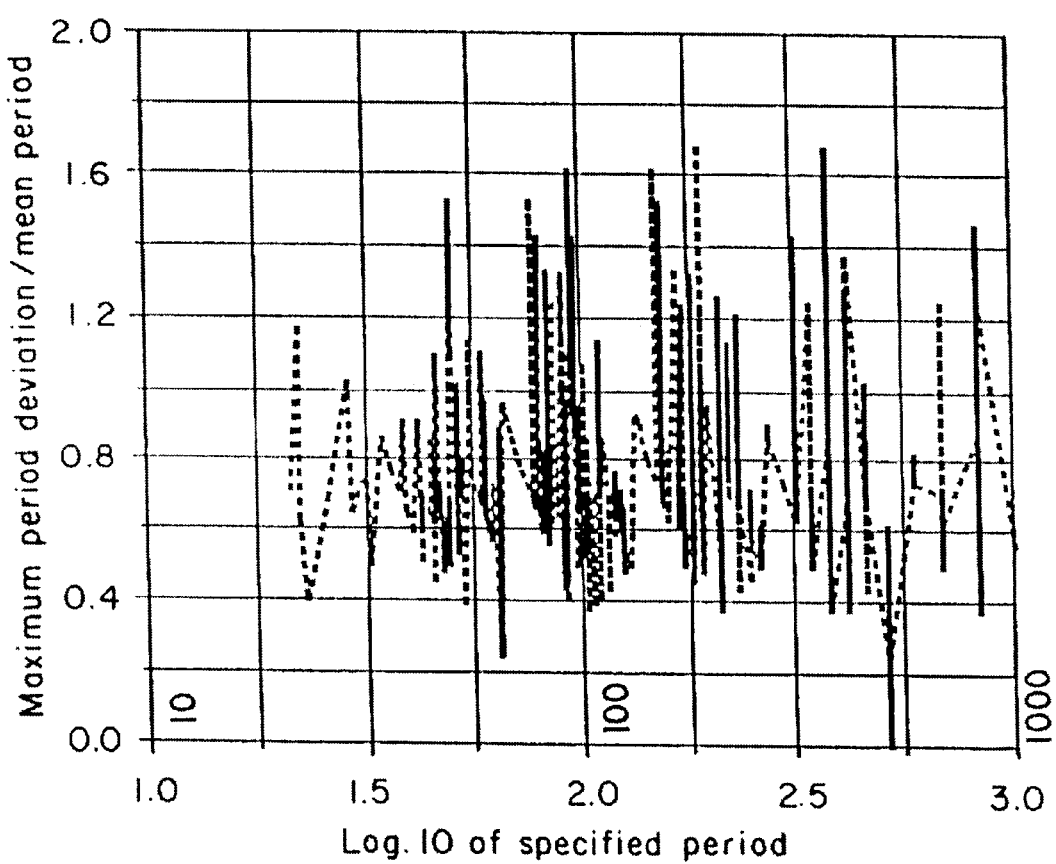
FIG. 13 illustrates the results of a computer simulation designed to determine the delay jitter, and hence the size of a smoothing buffer needed to eliminate the jitter.

The use of this scheduler in tandem with a smoothing buffer of roughly two-time-slots per supported stream in the next downstream node, which is a common practice, virtually guarantees faithful adherence to required sampling rates. FIG. 13 supports this assertion, by illustrating the result of a computer simulation of the operation of this scheduler. The aim of this simulation was to observe the absolute value of the deviation of the actual sampling interval for each stream and the corresponding guaranteed sampling interval. The sampling interval for a given stream, as described before, is the length of time that elapses between the start of successive samples of a stream's data units. The guaranteed sampling interval for a stream is the number of time-slots per frame divided by the number of guaranteed time-slots allocated to the stream in the frame. The simulation supported a mixture of 128 streams with widely varying guaranteed time-slot allocations, such that the sum of the supported service rates equalled 0.99 of the link capacity being managed by the scheduler. The scheduler was operated for many hundreds of millions of iterations, using many randomly selected combinations of service rates. On the horizontal axis of FIG. 13, there is the base-10 logarithm of the guaranteed sampling interval for each test stream. On the vertical axis, there is the absolute value of the deviation of the actual sampling interval from the guaranteed sampling interval. The resulting output plot illustrates that the absolute value of the normalized maximum deviation between the allocated and guaranteed sampling intervals during a frame-cycle, for any of the created combinations of streams, averaged less than one time-slot, and never exceeded two time-slots.

It is to be noted that the disclosed scheduler, specifically through the combined operation of the allocated rates table 8, the cycle remainder table 9, the 20-bit adder 10, the adder 13 associated with the 20-bit adder 10, and the logic circuitry 14 associated with the 11-bit accumulator 11, is able to set the average number of time-slots per stream per frame-cycle that is allocated to a real number. The outputs in FIG. 10 indicate that the scheduler is able to provide each stream with time-slot allocations that allow for the stream to be served at a rate that closely approaches the guaranteed time-slot allocation of that stream.

It is also to be noted that scheduler frame collisions cannot occur in this process, since reverse-binary relations map any number that is part of a count of allocated time-slots, to a unique time-slot in the update frame. Other types of mapping relations can also achieve this result.

It is also to be noted that because the aforementioned reverse-binary scattering process can be implemented using simple and therefore very fast components, frame scanning can be rapidly carried out. This in turn, along with the precise service rates made possible by the carry-over process, make it possible for the scheduler to use smaller sized scheduler frames. The use of smaller frames means that the system can be more responsive to changes in the streams' demands for link capacity.

Numerous modifications and variations of the present invention are possible in light of the above teachings. For example, stream-numbers need not be read from the scanning frame in reverse-binary order. Instead, they can be written into the frame in reverse-binary order and then sequentially scanned by the link controller.

It is to be understood that a single-memory scheduler which can be concurrently updated by the scheduler 5 and read by the link controller 3, could be used instead of the dual-memory scheduler architecture disclosed herein. There is a speed advantage however, associated with using a memory for updating and another memory for scanning.

The scheduler can also be easily extended to ensure that when streams have no traffic to transmit during a given frame cycle, link capacity is not wasted. Two design options are available depending on whether fixed rate service or guaranteed minimum rate service is being supported by the scheduler. Both options require the link controller 3 to be able to look inside the cell buffer of the stream it is serving when carrying out the scanning process, to see if that stream has any cells to transmit.

Figure 14:
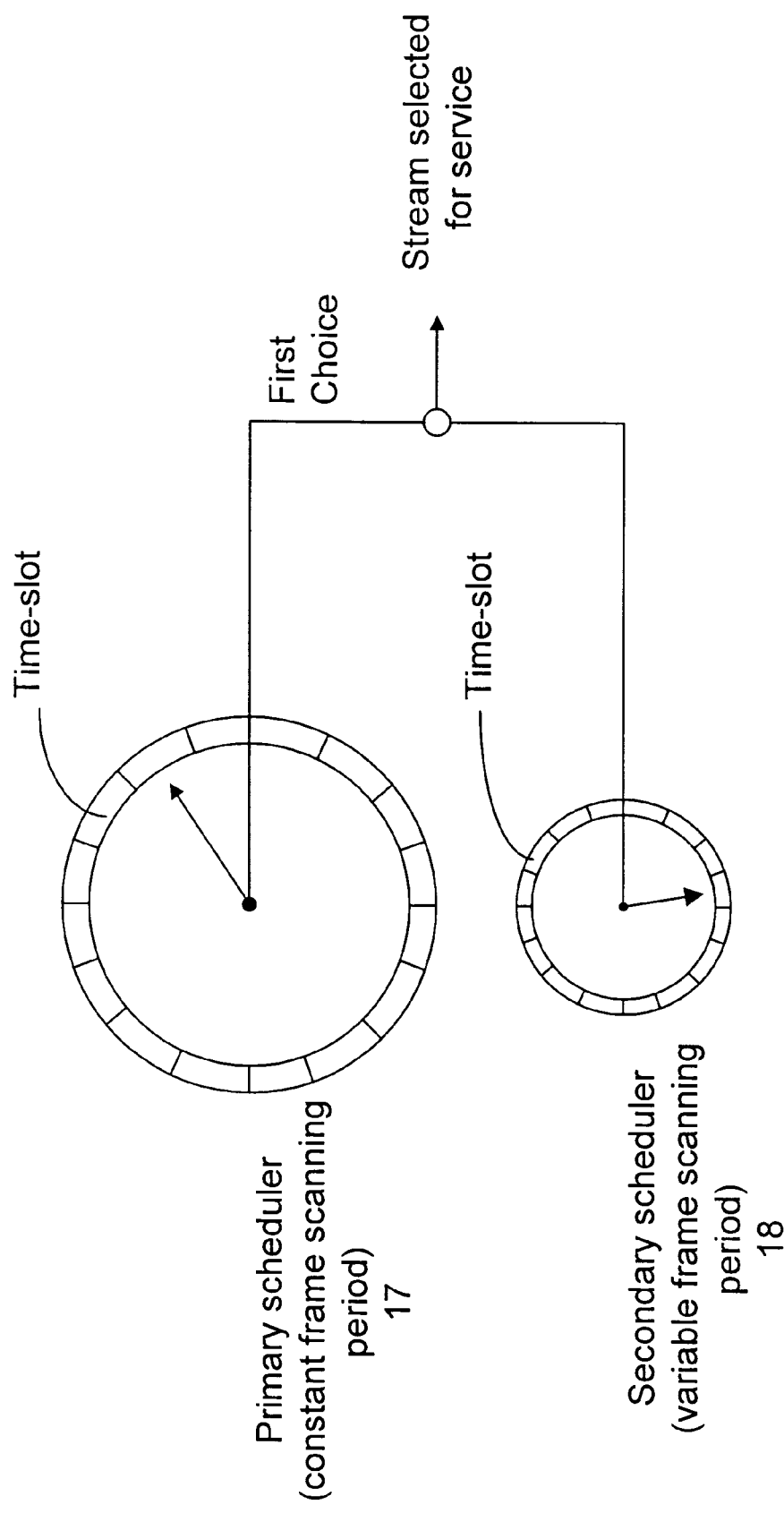
FIG. 14 illustrates a scheme for passing unallocated slots to streams served by a secondary scheduler.

If fixed rate service is being supported, whenever the eligible stream has an empty cell queue, the link controller 3 can allow secondary schedulers handling lower priority data traffic, such as unspecified bit rate (UBR) traffic, to fill the link capacity associated with the empty time-slots with their own unregulated-rate data. This scheme is illustrated in FIG. 14, which depicts a primary scheduler 17 with a frame scanning period of T, and a secondary scheduler 18 whose streams are served only when at least one of the streams of the primary scheduler 17 is inactive. While the frame scanning period of the primary scheduler 17 is constant, the frame scanning period of the secondary scheduler 18 is not constant as it is a function of the number of vacant slots in the primary scheduler 17.

FIG. 15 shows how streams served by a secondary scheduler (hereinafter rate-unregulated streams) can pick up fractions of the link capacity that are unused by the streams served by primary schedulers (hereinafter rate-regulated streams). More specifically, FIG. 15 depicts the allocations made to a group of streams, over a period of six frame-cycles. The allocations are illustrated in the figure as fractions of the total number of slots, L. One of the groups of streams is a rate-unregulated stream that essentially gets any time-slots not needed by the other seven rate-regulated streams, numbered 0 to 6 in FIG. 15. The allocation of the rate unregulated stream varies with the number of time-slots requested by the rate-regulated streams. In frame-cycle 1 for example, stream 1 required .02*L more time-slots than it did in frame-cycle 0 (0.1*L as opposed to 0.08*L). As a result, the number of time-slots left for the rate unregulated stream dropped, from 0.14*L to 0.12*L, between frame-cycles 0 and 1. FIG. 15 also shows A how other changes in the requested allocations of the rate regulated streams similarly affected the number of time-slots received by the rate unregulated stream.

If guaranteed minimum service rates are being provided, the scheduler can still be easily extended to ensure that the presence of streams without traffic to transmit during a given frame cycle does not result in a waste of link capacity. Under this option, users are not given a fixed rate of service, but rather a threshold rate beneath which their service rate will not fall. Delay-sensitive data should not be supported under this service. When this service is offered, the time-slots freed up whenever a stream without cells to transmit is encountered can be passed to other streams supported by the same scheduler which presently have cells to transmit.

Figure 16:
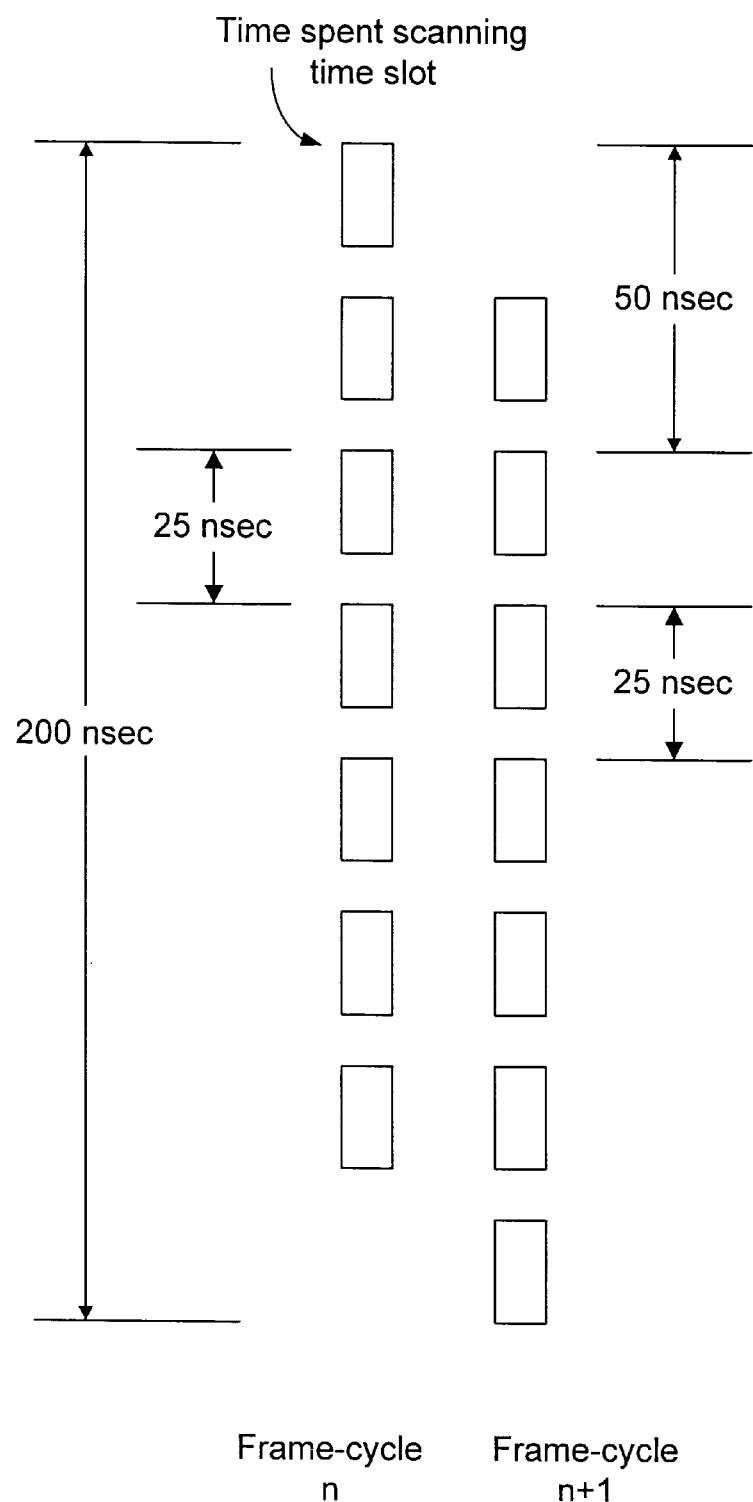
FIG. 16 illustrates the time typically needed to scan several slots in the search for an active stream in one implementation of the scheduler.

The problem with this approach, which arises if several consecutive streams without cells to transmit are encountered, is that so much time might be spent trying to find a stream with cells to transmit that time-slots may have to go unfilled. This is quite conceivable because of the small period of time, in the order of a hundred nanoseconds, within which time-slots must be filled. FIG. 16 shows the time typically needed to scan several entries of the allocated rates table 8 and cell buffers, when searching for a stream with cells to transmit. Assuming a time-slot must be filled in 200 nanoseconds, a typical memory access time plus other overhead of 25 nanoseconds, means that at most seven time-slots in the allocated rates table 8 and cell buffers can be scanned before the time required to fill in one of the time-slots of the scheduler frame expires. Not filling time-slots because too much time is spent locating streams with cells to transmit, is somewhat wasteful.

Figure 17:
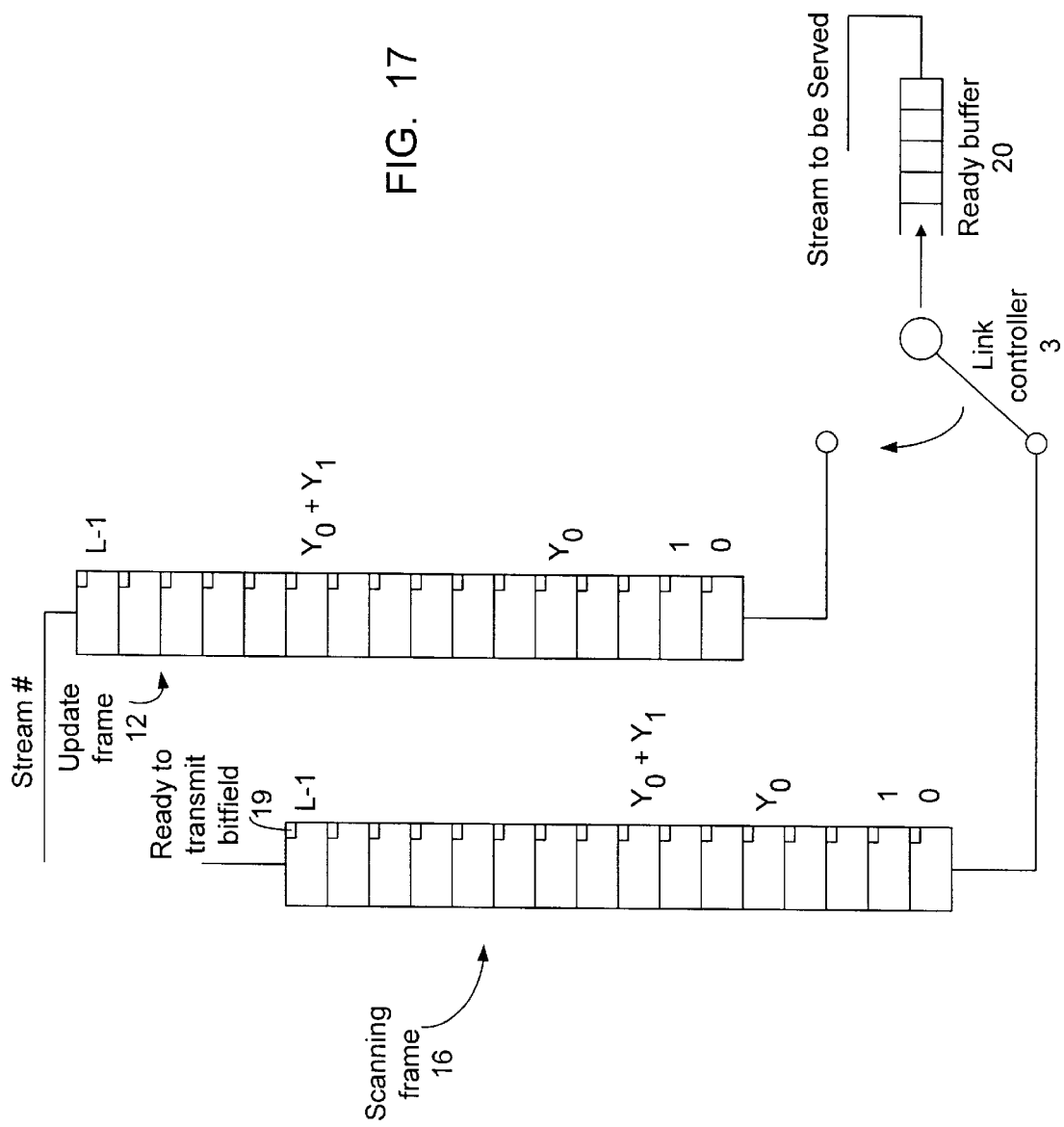
FIG. 17 illustrates a frame update process where more than one slot is being scanned during a time-slot.

The occurrence of this situation can be virtually eliminated if a buffer of pointers to streams with cells to transmit is constantly maintained by the scheduler 5 to handle the contingency of a long sequence of streams without cells to transmit. FIG. 17 shows such a scheme. The scanning frame 16, the update frame 12, and the link controller 3 from FIG. 9 are illustrated in FIG. 17. The two frames 16,12 are modified by attaching a ready-to-transmit bit field 19 to all their time-slots. This field 19 is updated in the scanning frame 16 every time its time-slot is scanned, and indicates whether the stream corresponding to the stream-number of the time-slot, has a cell that is ready to transmit.

Attached to the link controller 3 is a ready buffer 20. The link controller 3 uses the ready buffer 20 to decide which streams shall be served. That is, instead of serving the streams whose stream-numbers are read from the scanning frame 16, the link controller serves streams whose numbers are read from the ready buffer 20. The ready buffer 20 is populated with stream-numbers by using the following process. During each time-slot scanning period the link controller 3 checks two consecutive time-slots. Each time-slot that has been mapped to active streams, an active stream being a stream with at least one cell to transmit, has its stream-number placed into the ready buffer 20. The other time-slots are passed over by the link controller 3. A stream is removed from the ready-buffer 20 once it has been served by the link controller 3. The queueing of stream-numbers into the ready buffer 20 is halted whenever more than four steam-numbers are enqueued and resumes when less than four stream-numbers are enqueued, for example. Other numbers can be used.

Figure 18:
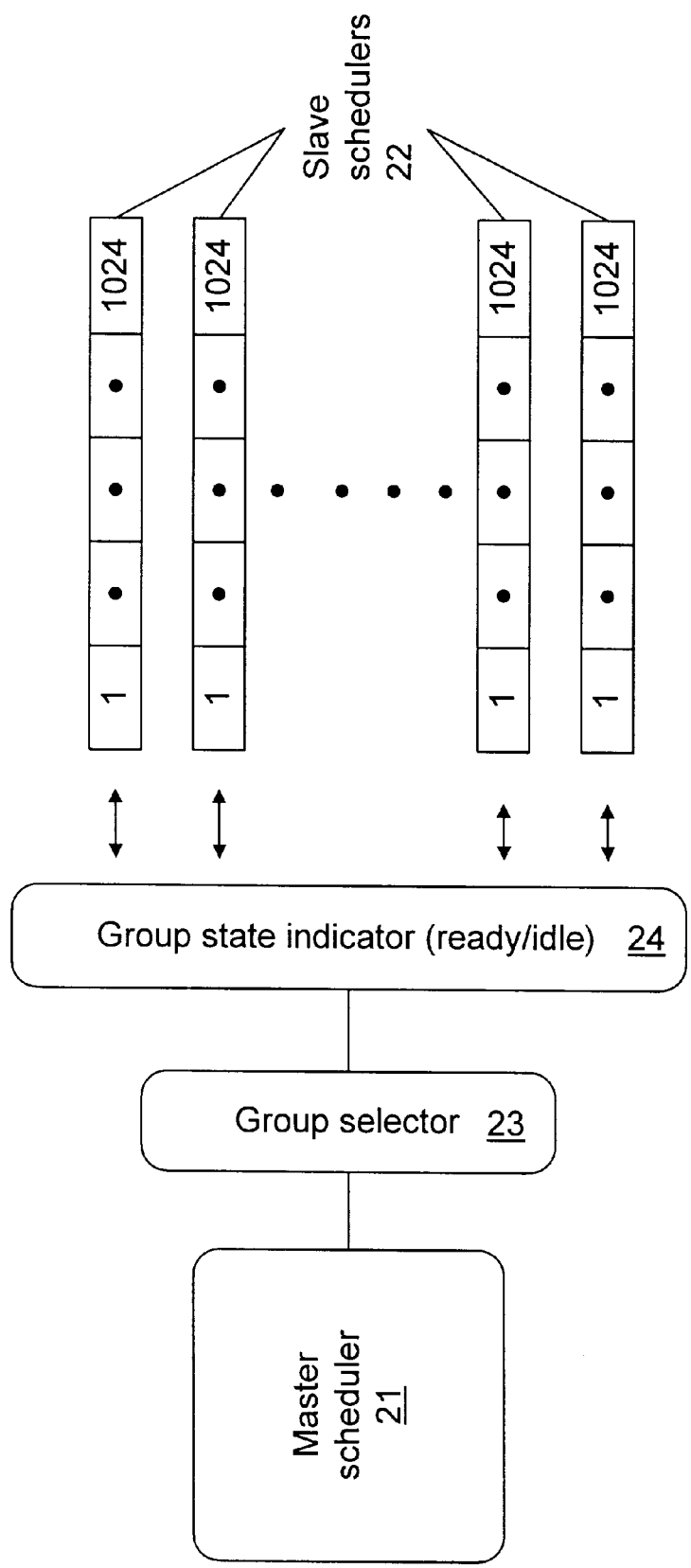
FIG. 18 illustrates schematically a compound scheduler.

The scheduler can also be extended to support more streams, without changing its high resolution service rates, if it is implemented as a two-level compound scheduler. Such a compound scheduler is illustrated in FIG. 18, which includes a master scheduler 21, connected to a battery of 64 slave schedulers 22, through a selector 23, and a group state indicator 24. The master scheduler 21 supports 64 groups of streams. Each group is controlled by a slave scheduler 22 which typically serves about 500 streams. The master scheduler 21 controls allocations of link capacity to the slave schedulers 22, in exactly the same manner that a scheduler controls allocations of link capacity to individual streams. The master scheduler 21 finds out which slave schedulers 22 are supporting streams with cells to transmit by consulting the entries in the group state indicator 24. The selector 23 is used to select which of the slave schedulers 22 to poll in the group state indicator 24. Once one of the slave schedulers 22 is selected, it is allocated link capacity by the master scheduler 21. The capacity is then allocated amongst individual streams. Such an arrangement provides more flexibility than a single monolithic scheduler design, especially if a large number of streams is being supported. The simple and efficient design of the disclosed scheduler allows this compound architecture to support adequately high resolutions of service rates. The update period for these compound schedulers can be limited to a reasonable size using a fast-update procedure. Without this procedure, a change in the number of slots required by a given stream, would require changing the number of slots allocated to each group. This would mean having to change the number of slots allocated to other groups, which in turn would mean changing the slot allocations of at least some of the streams in these other groups. Under a fast-update procedure, when a stream within one of the groups changes its time-slot allocation, the scope of the update procedure necessitated by the change may be localized to the group where the change occurred. This reduces the need to update stream-allocations within other groups every time a single stream in the entire compound scheduler changes its allocation.

Figure 19:
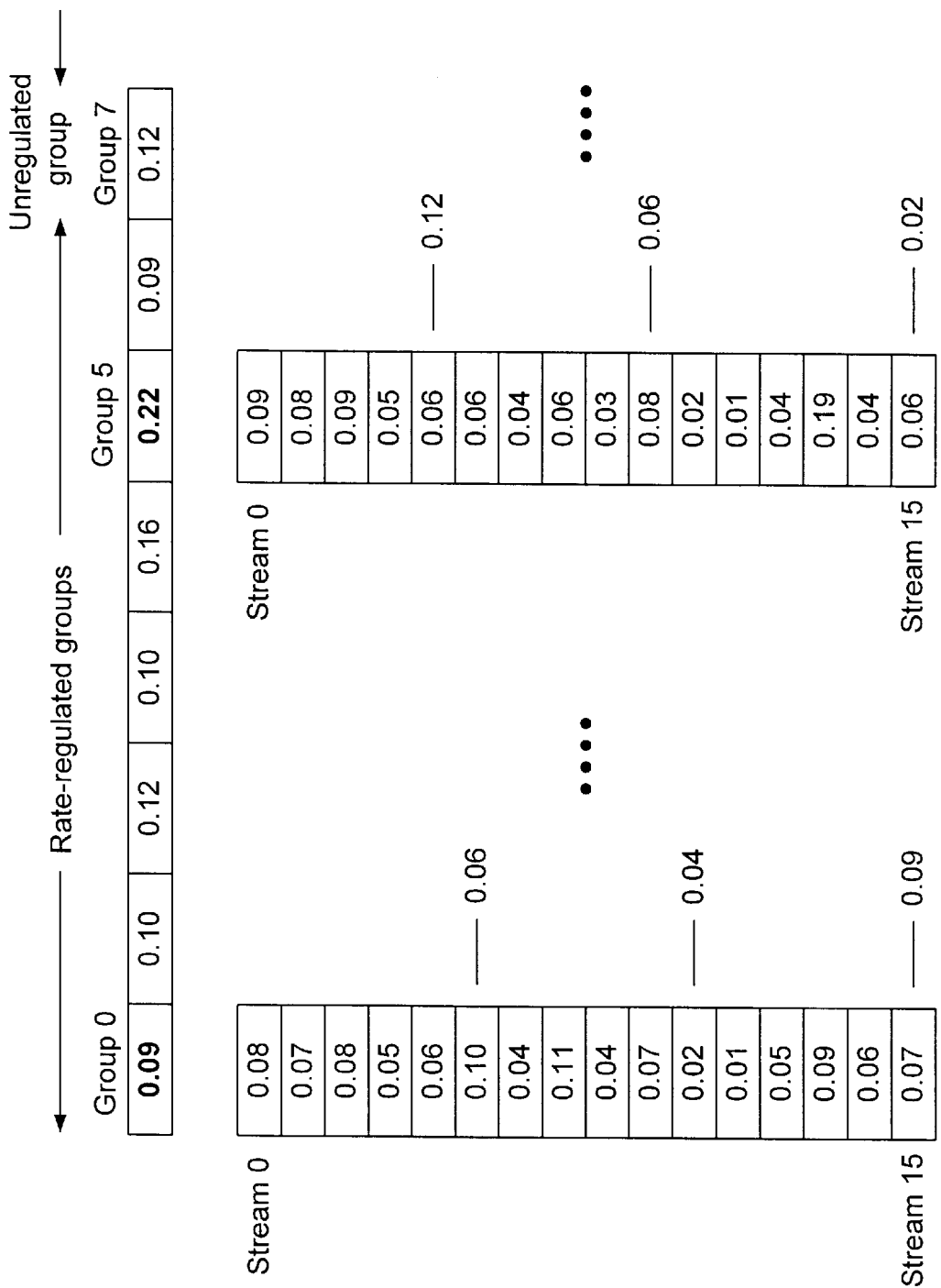
FIG. 19 illustrates an example of a fast-update procedure using a compound scheduler.

FIG. 19 illustrates an example of the fast-update procedure. At the top of the figure is a table that sets out how a master scheduler divides the capacity of a link between eight groups of streams. In the lower half of the figure are two tables that set out how two slave schedulers have divided the capacity allocated to two groups, group 0 and group 5 respectively, amongst sixteen streams in each group. All entries in these tables are expressed as fractions of the total number of time-slots controlled by a given slave scheduler. Two examples of a change in stream-allocations are illustrated. One, which occurs in group 0, involves stream 5 losing $0.04*L_{group0}$ time-slots, and the other which occurs in group 5, involves stream 4 gaining $0.06*L_{group1}$ time-slots. The compound scheduler's reaction to both changes is restricted to the group within which each change occurs. The reaction to the change in group 0 is to grant each of the streams 10 and 15 of the same group, $0.02*L_{group0}$ time-slots. In this scenario, streams 10 and 15 have requested these increments. The reaction to the change in group 5 is to remove from streams 9 and 15, also of group 5, $0.02*L_{group5}$ slots and $0.04*L_{group5}$ slots, respectively. Such a fast-update procedure allows the compound scheduler to attempt to avoid changing the slot allocations of any streams falling outside the group where the change occurred, which in turn keeps the update period relatively small. It is to be noted that if the allocation of an entire group must change, the effects of such a change could still be limited to that group and the rate-unregulated group (group 7), by passing all the time-slots gained or lost by the changing group, to or from only the rate-unregulated group.

The service rate for an individual stream being supported by a compound scheduler, is calculated by multiplying the relative service rate given to its slave scheduler 22 by the master scheduler 21 on one hand, with the relative service rate the slave scheduler 22 directly provides to that stream on the other hand. For example, if the master scheduler's 21 scheduler frame contains 1024 time-slots, and one of the slave schedulers 22 receives 82 of those time-slots per frame-cycle, then that slave scheduler 22 allocates 8% of the entire link's rate to the streams it is supporting. If the same slave scheduler 22 itself uses a scheduler frame containing 2048 time-slots, and if a given stream occupies 640 of those time-slots, then the relative service rate of that stream is 31.25% of the part of the link capacity controlled by the slave scheduler 22. This means the service rate for that given stream is 2.5% of the total link rate.

The design of the reverse-binary embodiment of the scheduler could also be adapted to handle frame sizes other than powers of two. This would be done by simply accepting the fact that some null entries belonging to a null stream will populate the scheduler frame's time-slots and then instructing the link controller 3 to skip null entries and proceed to the next time-slot in the frame as rapidly as possible when one is encountered. This is particularly easy to implement with the ready buffer 20 of FIG. 17.

The allocated rates table 8 can be updated periodically or upon the occurrence of a certain number of stream set-ups, tear-downs, or requested service-rate changes.

It also will be appreciated by those skilled in the art that unique one-to-one mapping relations other than a reverse-binary relation could be employed that would achieve many of the objects of this invention.

Other modifications and variations of the present invention are possible in light of the above teachings. It is therefore to be understood that within the scope of the appended claims, the invention may be practiced otherwise than as specifically described herein.

We claim:

1. In an Asynchronous Transfer Mode (ATM) switch, a process of scheduling cell transmissions out over a link for different streams of virtual circuits (VCs) or virtual paths (VPs) by having a link controller that effects such transmissions periodically scan a time-space map, that is comprised of time-slots whose positions within the map correspond to times during which data can be transmitted over an outgoing link and which time-slots are periodically updated with stream-number entries that each correspond to a stream, so that a stream-number entry written into the Nth time-slot of a given map corresponds to the stream that will own the Mth cell transmitted as a result of the link controller scanning the map, where M and N are related by a one-to-one mapping relation wherein each stream is allocated an integer number of time-slots each frame-cycle, a frame-cycle being a single iteration of the periodically repeated process of allowing all the streams a chance to update the time-space map with stream-number entries, according to a process that comprises the steps of:

causing each stream to have allocated to it the integer part of the real-number representation of the sum of a guaranteed time-slot allocation for the stream and a carry-over for the stream, the carry-over for the stream being the difference between the total number of time-slots owed to the stream and the total number of time-slots allocated to the stream just prior to the present frame-cycle; and, setting the carry-over for the next frame-cycle equal to the non-integer part of the sum of the guaranteed time-slot allocation for the stream and the carry-over for the stream.

2. The process of claim 1 wherein the mapping relation is a reverse-binary relation.

3. A scheduling apparatus for scheduling ATM cell transmissions for different streams of virtual circuits or virtual paths comprising:

a time-space map that is comprised of time-slots whose positions within the map correspond to times during which data can be transmitted over an outgoing link and which time-slots are periodically updated with stream-number entries that each correspond to a stream;

a first setting means for setting a guaranteed time-slot allocation for each stream per frame cycle, a frame-cycle being a single iteration of the periodically repeated process of allowing all the streams a chance to update the time-space map with stream-number entries;

an allocating means for allocating to each stream for each frame cycle a number of time-slots equal to the integer part of the sum of a guaranteed time-slot allocation for the stream and a carry-over for the stream, the carry-over for the stream being the difference between the total number of time-slots owed to the stream and the total number of time-slots allocated to the stream just prior to the present frame-cycle; and a second setting means for setting the carry-over for the next frame-cycle equal to the non-integer part of the sum of the guaranteed time-slot allocation for the stream and the carry-over for the stream.

4. In an Asynchronous Transfer Mode (ATM) switch, a process of scheduling cell transmissions out over a link for different streams of virtual circuits (VCs) or virtual paths (VPs) using a time-space map that is comprised of time-slots whose positions within the map correspond to times during which data can be transmitted over an outgoing link and which time-slots are periodically updated with stream-number entries that each correspond to a stream, said process comprising the following steps, said steps to be repeated at appropriate intervals:

setting up the time-space map;

determining a guaranteed time-slot allocation of each stream; and, causing each stream to have allocated to it an integer number of time-slots that substantially equals the guaranteed time-slot allocation for that stream, causing the time-slots allocated to each stream to each be updated with the stream's stream-number entries, and then causing all the stream-number entries in the time-slots to be scanned by a link controller that effects cell transmissions, such that the combined effect of the allocating, updating and scanning steps is that a stream-number entry written into the Nth time-slot of a given map, corresponds to the stream that will own the Mth cell transmitted as a result of the link controller scanning the map, where M is the reverse-binary representation of N.

5. In an Asynchronous Transfer Mode (ATM) switch wherein cell transmissions out over a link are scheduled for different streams of virtual circuits (VCs) or virtual paths (VPs), and wherein each stream is allocated an integer number of time-slots during each frame-cycle, a frame-cycle being a single iteration of the periodically repeated process of allowing all the streams a chance to update a time-space map with stream-number entries that each correspond to a stream, a time-slot allocation process executed for each frame-cycle that comprises the steps of:

causing each stream to have allocated to it a number of time-slots equal to the integer part of the real-number representation of the sum of a guaranteed time-slot allocation for the stream and a carry-over for the stream, the carry-over for the stream being the difference between the total number of time-slots owed to the stream and the total number of time-slots allocated to the stream just prior to the present frame-cycle; and, setting the carry-over for the next frame-cycle equal to the non-integer part of the sum of the guaranteed time-slot allocation for the stream and the carry-over for the stream.

6. The process of claim 4 in which the time-slots are updated in sequential order and scanned in reverse-binary order.

7. The process of claim 4 in which the time-slots are updated in reverse-binary order and scanned in sequential order.

8. The process of claim 4, wherein the time-slot allocation process is repeated once each frame-cycle, a frame-cycle being a single iteration of the periodically repeated process of allowing all the streams a chance to update a time-space map with stream-number entries, and comprises the steps of:

causing each stream to have allocated to it the integer part of the real-number representation of the sum of the guaranteed time-slot allocation for the stream and a carry-over for the stream, the carry-over for the stream being the difference between the total number of time-slots owed to the stream and the total number of time-slots allocated to the stream just prior to the present frame-cycle; and, setting the carry-over for the next frame-cycle equal to the non-integer part of the sum of the guaranteed time-slot allocation for the stream and the carry-over for the stream.

9. The process of claim 4 as used by a master scheduler to allocate link capacity to slave schedulers that in turn allocate link capacity to other schedulers or individual streams of VCs or VPs.

10. The process of claim 9 wherein time-slots that are allocated to a stream that does not need them in the current frame-cycle, a frame-cycle being a single iteration of the periodically repeated process of allowing all the streams a chance to update a time-space map with stream-number entries, are passed to schedulers other than the one that serves the stream, for distribution amongst other streams during the current frame-cycle.

11. The process of claim 9 wherein changes in the number of time-slots allocated per frame to a stream that is served by a given scheduler, triggers changes in either the number of time-slots allocated to other streams that are served by the same given scheduler, or the number of time-slots allocated to rate-unregulated streams.

12. The process of claim 4 wherein the step of determining the guaranteed time-slot allocation for each stream is carried out at a regular fixed frequency.

13. The process of claim 4 wherein the step of determining the guaranteed time-slot allocation for the stream is event-driven.

14. The process of claim 4 wherein during the scanning step, time-slots that are reserved for a stream that does not have cells to transmit during the current frame-cycle are assigned to other streams that have cells to transmit and that are being served by the same scheduler.

15. The process of claim 14, wherein the scanning step additionally comprises the steps of periodically updating the entries of a ready-buffer with the stream-numbers of the streams that have cells to transmit, and the link controller scanning the ready buffer to determine the sequence by which cells should be transmitted out over the link.

16. The process of claim 4 wherein the data unit transmitted when a time-slot is scanned, is changed to facilitate the scheduling of the transmission of fixed-size data units other than ATM cells.

17. The process of claim 4 wherein a single time-space map is concurrently updated and scanned.

18. The process of claim 4 wherein two time-space maps, an update frame and a scanning frame, are used, such that the former is updated while the latter is scanned, and such that the maps swap roles at the start of every frame-cycle, a frame-cycle being a single iteration of the periodically repeated process of allowing all the streams a chance to update a time-space map with stream-number entries.

19. The process of claim 4 wherein the number of time-slots in the map is substantially equal to a power of 2.

20. The process of claim 4 wherein the number of time-slots in the map is two times the number of streams being supported by the scheduler, rounded-up to the nearest power-of-two number.

21. The process of claim 4 wherein the step of setting up the time-space map includes the step of determining a total number of time-slots for the entire map so as to give each supported stream an opportunity to request a very precise fraction of the link capacity it needs.

22. A scheduling apparatus for scheduling ATM cell transmissions without incurring high-delay jitter comprising one or more time-space maps for scheduling the order in which the cells of streams buffered in a memory will be transmitted out over a network link, a frame updater that writes stream numbers that each correspond to a stream into the maps in sequential or reverse-binary order, a link controller that scans the maps for stream numbers in reverse-binary or sequential order in effecting the transmission of the cells out over a network link, an accumulator and associated circuitry for ensuring that a frame-cycle ends once all the time-slots of the map are filled with unscanned stream numbers, a frame-cycle being a single iteration of the periodically repeated process of allowing all the streams a chance to update the map with stream-number entries, an allocated rates table for keeping track of the guaranteed time-slot allocation of each map, and a connection admission control processor for adding and removing new entries from the allocated rates table.

23. A scheduling apparatus for scheduling cell transmissions for different streams of virtual circuits (VCs) or virtual paths (VPs), which can simultaneously support highly precise service rates and provide fast responsiveness to changing capacity requirements, comprising one or more time space maps for scheduling the order in which the cells of streams buffered in a memory will be transmitted out over a network link, a frame updater that writes stream numbers that each correspond to a stream into the maps, a link controller that scans the maps for stream numbers in effecting the transmission of the cells out over a network link, an accumulator and associated circuitry for ensuring that a frame-cycle ends once all the time-slots of the map are filled with unscanned stream numbers, a frame-cycle being a single iteration of the periodically repeated process of allowing all the streams a chance to update the time-space map with stream-number entries, an allocated rates table for keeping track of the guaranteed time-slot allocation of each stream, a connection admission control processor for adding and removing new entries from the allocated rates table, a cycle remainder table for holding carry-over values for each stream, the carry-over for a stream being the difference between the total number of time-slots owed to the stream and the total number of time-slots allocated to the stream just prior to the present frame-cycle, and an adder and associated circuitry for summing guaranteed time-slot allocations and carry-over values for each stream and using the integer part of the sum to determine a time-slot allocation for the stream for the present frame-cycle, and the non-integer part of the sum to determine the carry-over for the stream for the next frame-cycle.

24. A scheduling apparatus for scheduling ATM cell transmissions for different streams of virtual circuits or virtual paths comprising:

a time-space map that is comprised of time-slots whose positions within the map correspond to times during which data can be transmitted over an outgoing link and which time-slots are periodically updated with stream-number entries that each correspond to a stream;

a means for allocating time-slots to streams;

a means for updating the time-space map with new stream-number entries; and a means for scanning the time-space map for stream-number entries in order to determine the order in which cells belonging to the streams are to be transmitted;

such that a stream-number entry written into the Nth time-slot of a given map corresponds to the stream that will own the Mth cell transmitted as a result of the scanning of the map, where M and N are related by a one-to-one mapping relation.

25. The apparatus of claim 24 wherein the mapping relation is a reverse-binary relation.

* * * * *